United States Patent
Lim et al.

(10) Patent No.: US 10,299,104 B2
(45) Date of Patent: May 21, 2019

(54) METHOD FOR PERFORMING DISCOVERY IN WIRELESS COMMUNICATION SYSTEM AND DEVICE THEREFOR

(71) Applicant: LG ELECTRONICS INC., Seoul (KR)

(72) Inventors: Jinkwon Lim, Seoul (KR); Jingu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/545,223

(22) PCT Filed: Jan. 20, 2016

(86) PCT No.: PCT/KR2016/000586
§ 371 (c)(1),
(2) Date: Jul. 20, 2017

(87) PCT Pub. No.: WO2016/117926
PCT Pub. Date: Jul. 28, 2016

(65) Prior Publication Data
US 2018/0063694 A1    Mar. 1, 2018

Related U.S. Application Data

(60) Provisional application No. 62/105,704, filed on Jan. 20, 2015.

(51) Int. Cl.
*H04B 7/00* (2006.01)
*H04W 8/00* (2009.01)
(Continued)

(52) U.S. Cl.
CPC ............ *H04W 8/005* (2013.01); *G01C 17/02* (2013.01); *G01C 17/28* (2013.01); *H04W 4/02* (2013.01);
(Continued)

(58) Field of Classification Search
CPC ....... H04W 4/02; H04W 84/18; H04W 8/005; H04W 4/008; H04W 4/80; H04W 8/00; G01C 17/02; G01C 17/28
See application file for complete search history.

(56) References Cited

U.S. PATENT DOCUMENTS

2008/0311957 A1  12/2008  Jantunen et al.
2010/0009662 A1   1/2010  Khosravy et al.
(Continued)

FOREIGN PATENT DOCUMENTS

KR    10-2012-0079370 A    7/2012

*Primary Examiner* — Xin Jia
(74) *Attorney, Agent, or Firm* — Birch, Stewart, Kolasch & Birch, LLP

(57) ABSTRACT

This specification relates to a method for performing discovery in a wireless communication system. The method is performed by a first device, and includes turning on a direction-based discovery mode, obtains a first direction information related to a user from a second device, wherein the first direction information is information indicative of the progress direction of the user or the view direction of the user, exchanges a second direction information related to the locations of one or more peripheral devices with a third device, and performs discovery for a peripheral device existing in a specific direction among the peripheral devices based on the first direction information and the second direction information.

9 Claims, 21 Drawing Sheets

(51) Int. Cl.
  *H04W 4/02*    (2018.01)
  *H04W 84/18*   (2009.01)
  *H04W 4/80*    (2018.01)
  *G01C 17/02*   (2006.01)
  *G01C 17/28*   (2006.01)

(52) U.S. Cl.
  CPC ............. *H04W 4/026* (2013.01); *H04W 4/80* (2018.02); *H04W 84/18* (2013.01)

(56) References Cited

U.S. PATENT DOCUMENTS

| | | |
|---|---|---|
| 2012/0258669 A1 | 10/2012 | Honkanen et al. |
| 2014/0253733 A1 | 9/2014 | Norem et al. |
| 2016/0000951 A1* | 1/2016 | Kreiner ................ A61L 2/0047 422/24 |
| 2016/0205501 A1* | 7/2016 | Lee ...................... H04W 8/005 455/457 |
| 2017/0026800 A1* | 1/2017 | Kim ...................... H04W 4/026 |
| 2017/0339517 A1* | 11/2017 | Nakamura .......... H04W 40/244 |
| 2018/0206094 A1* | 7/2018 | Choi ...................... H04L 12/28 |

* cited by examiner

[FIG. 1]
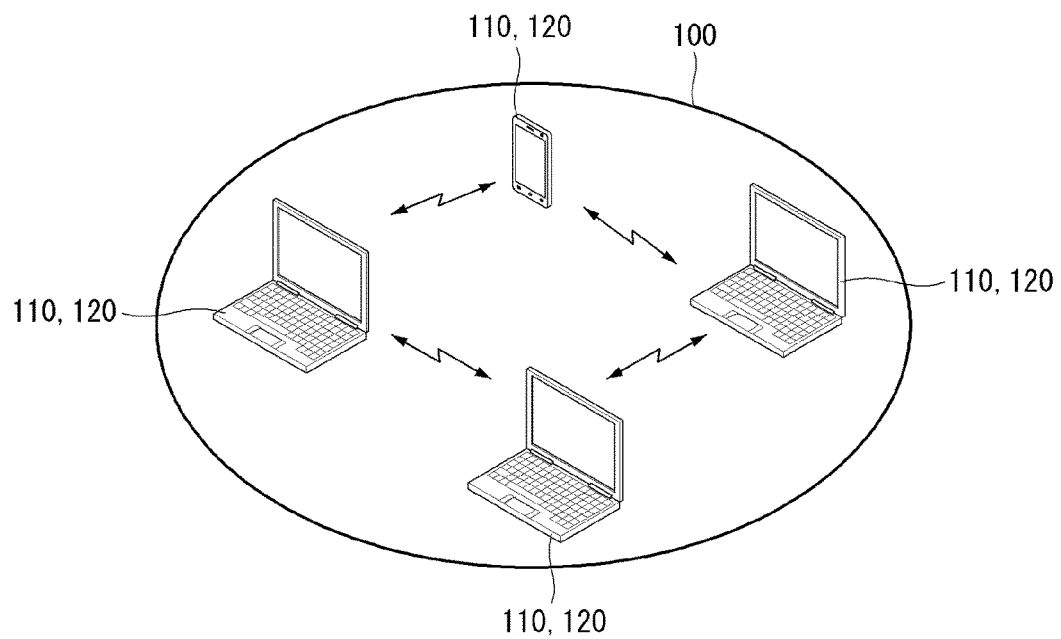

[FIG. 2]
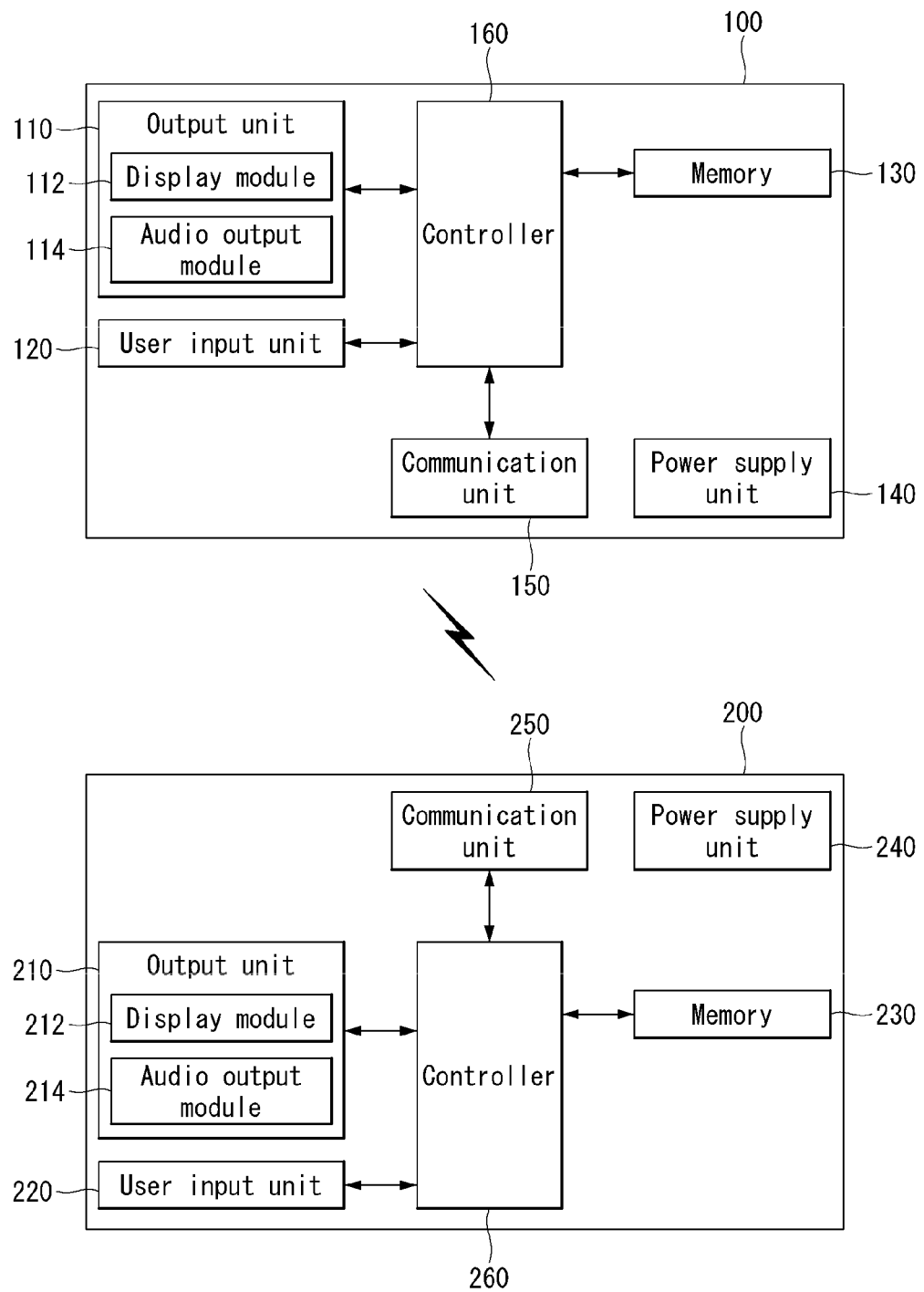

[FIG. 3]
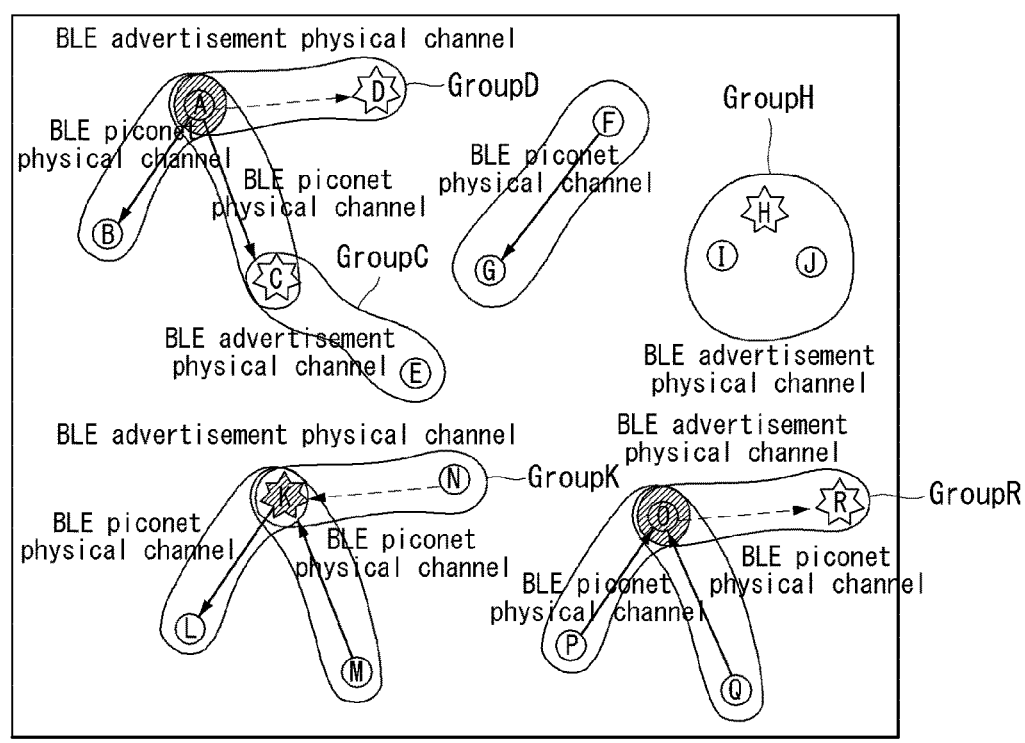

[FIG. 4]
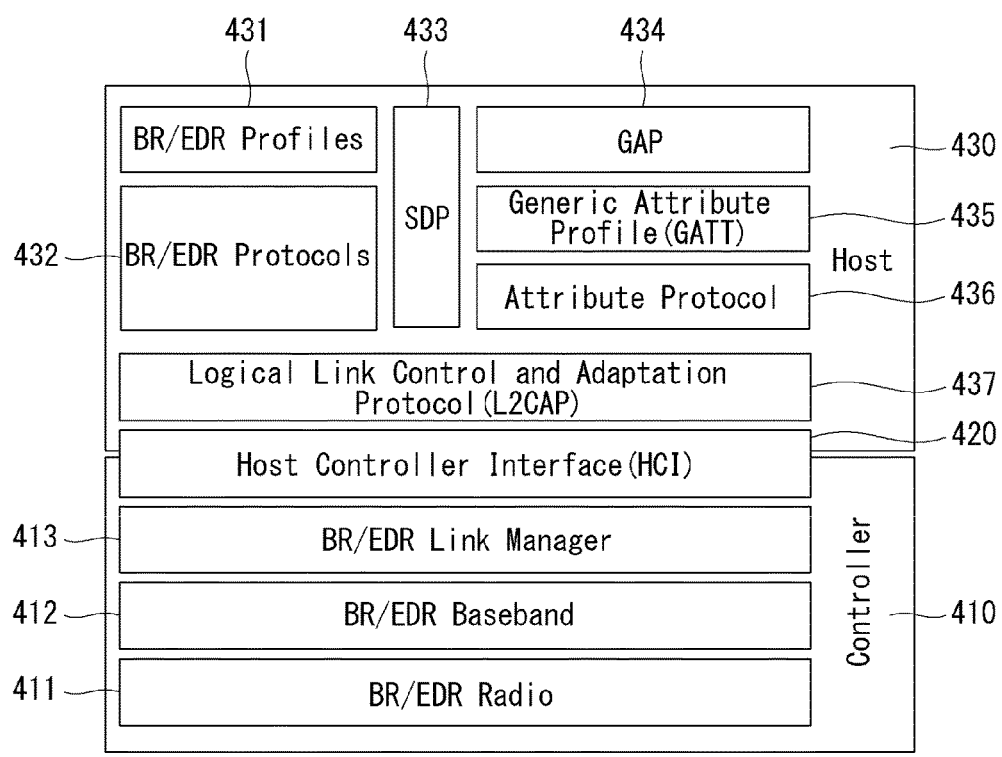

[FIG. 5]
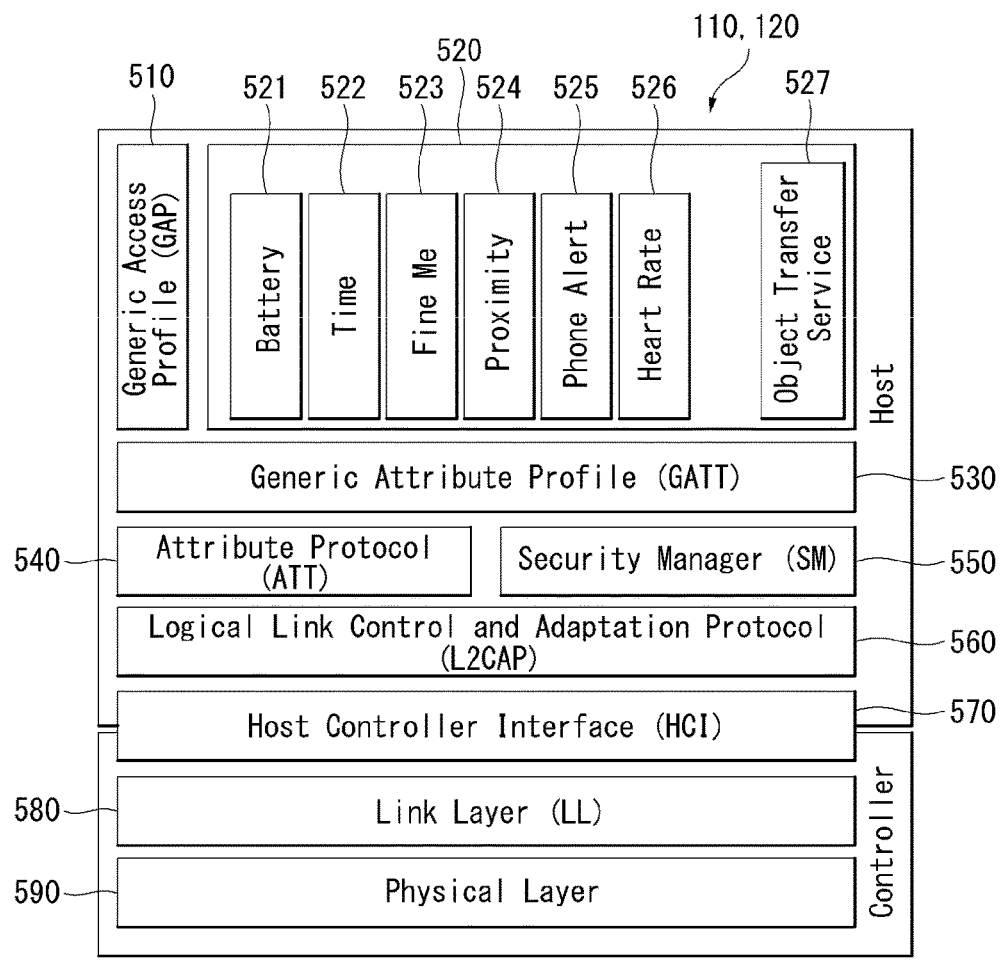

[FIG. 6]
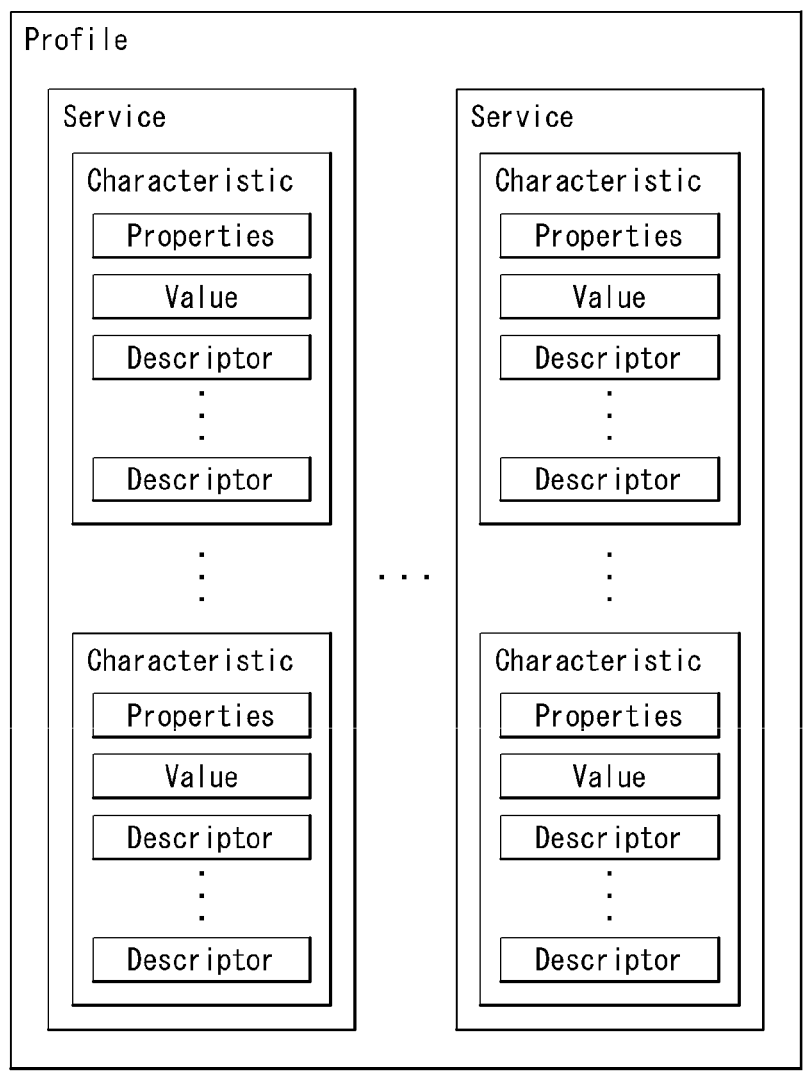

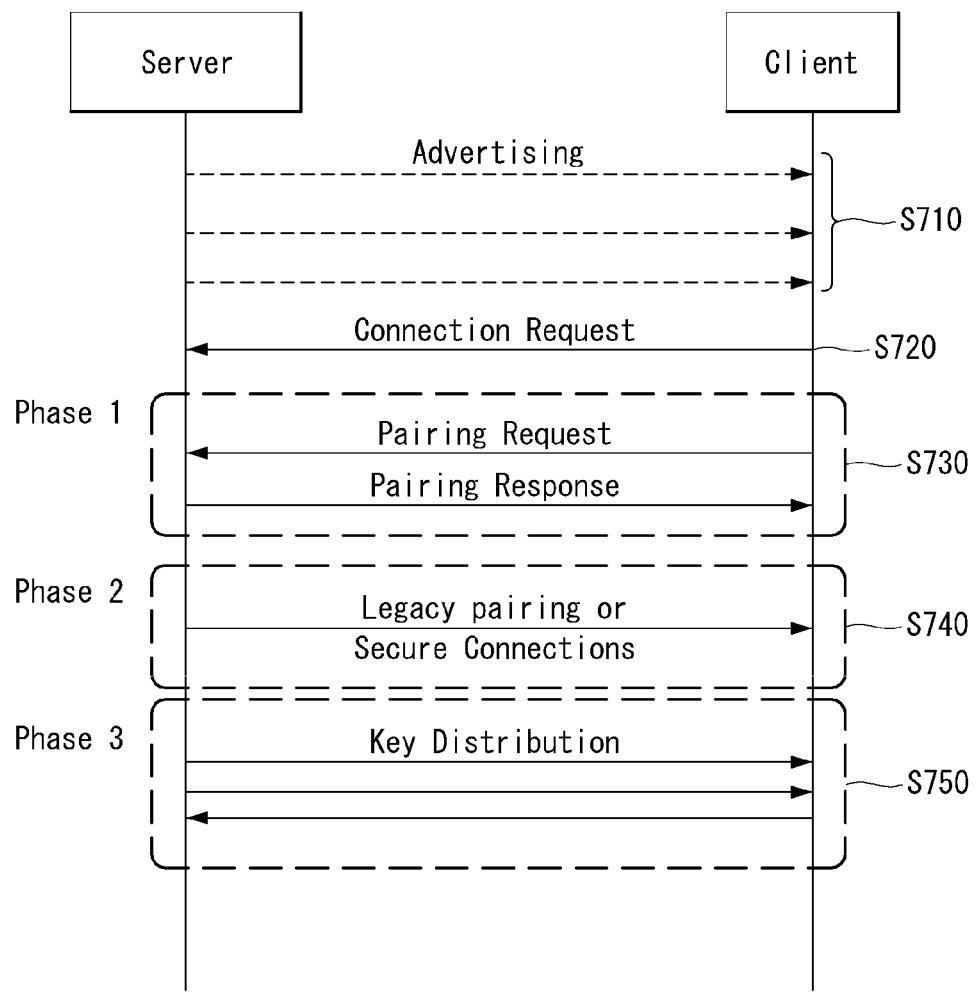
[FIG. 7]

[FIG. 8]
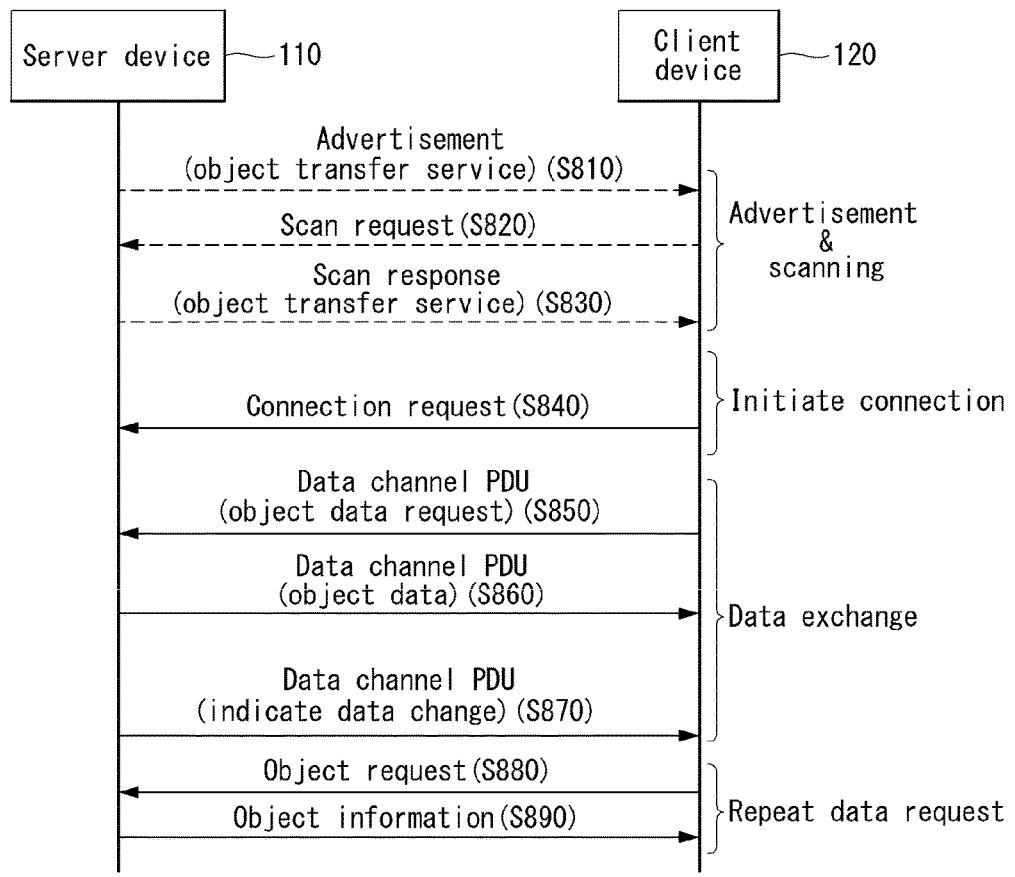

[FIG. 9]
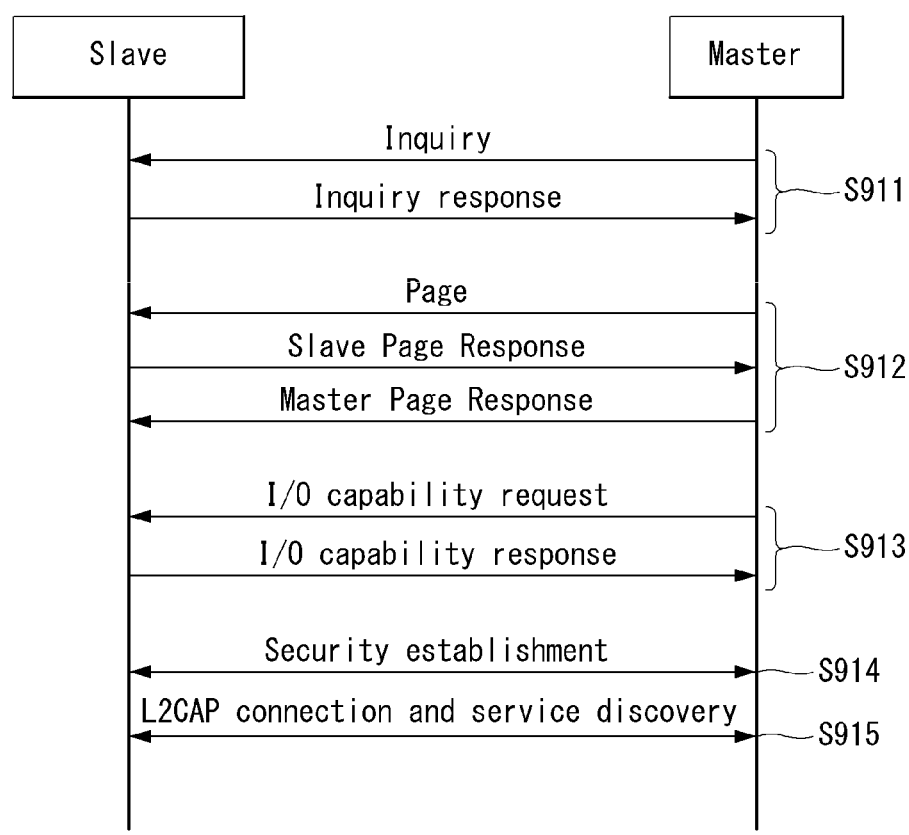

[FIG. 10]
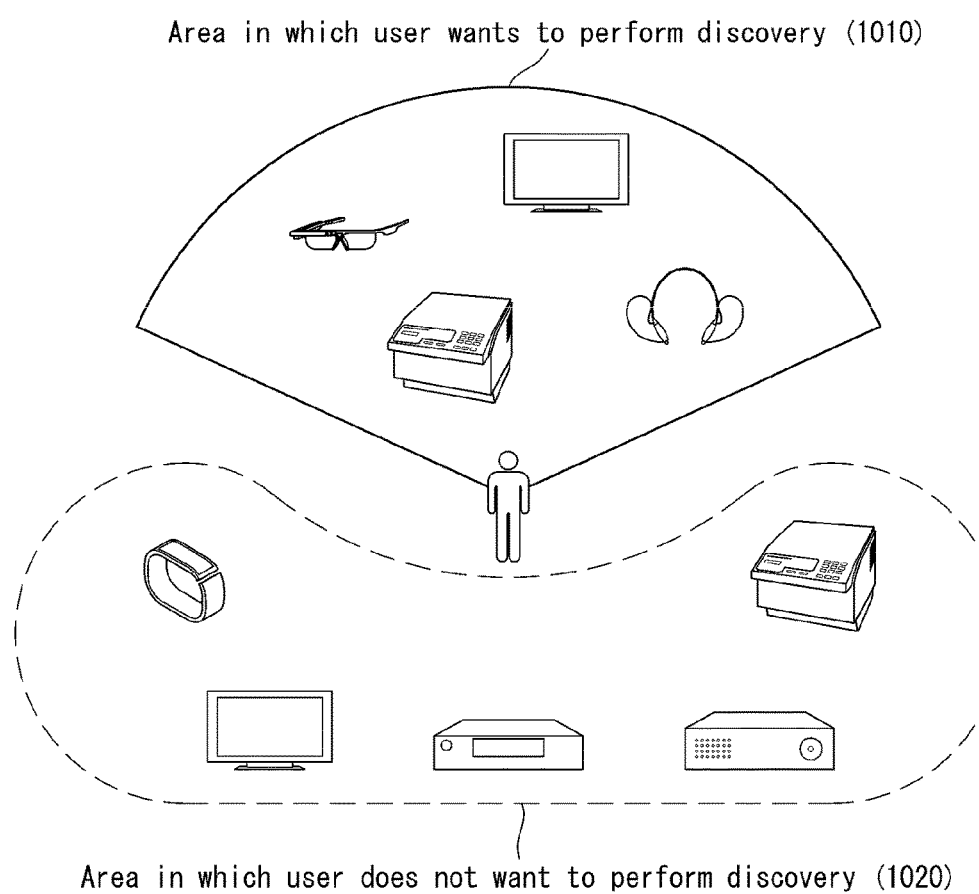

[FIG. 11]
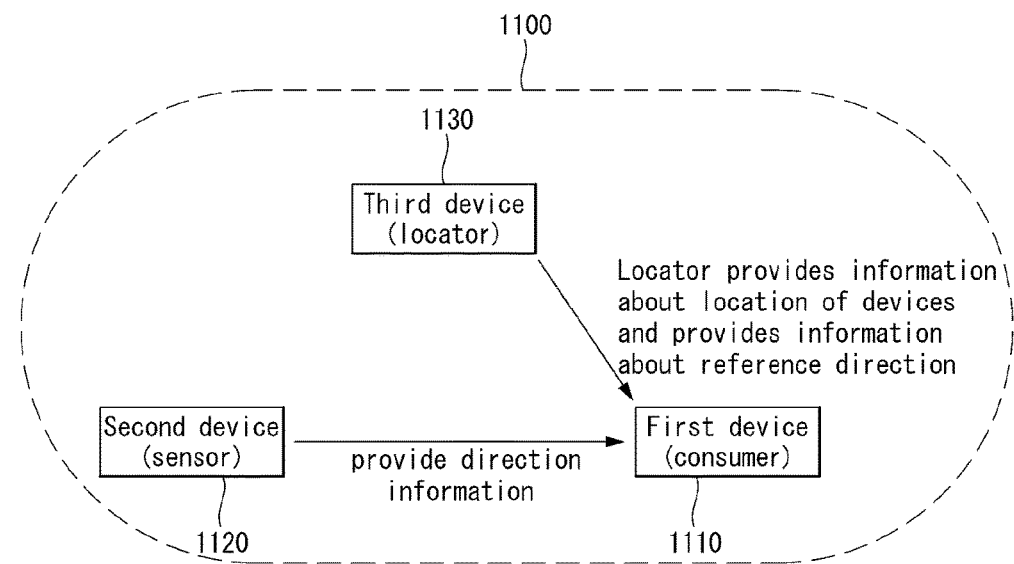

[FIG. 12]
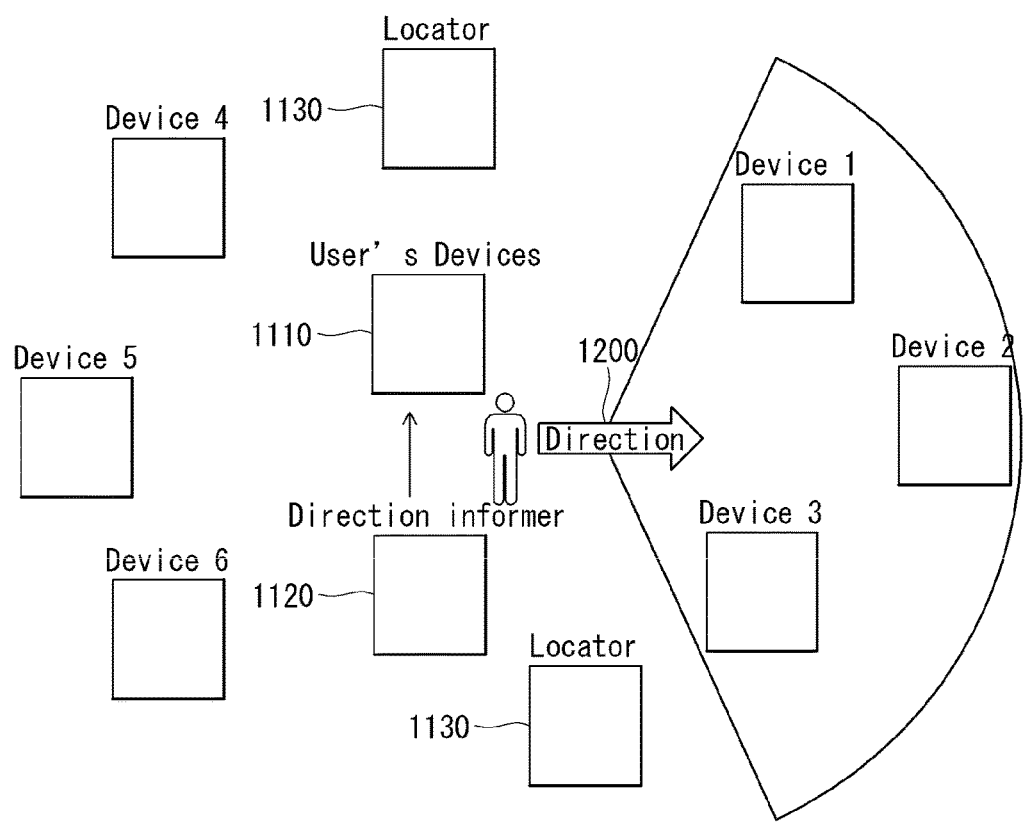

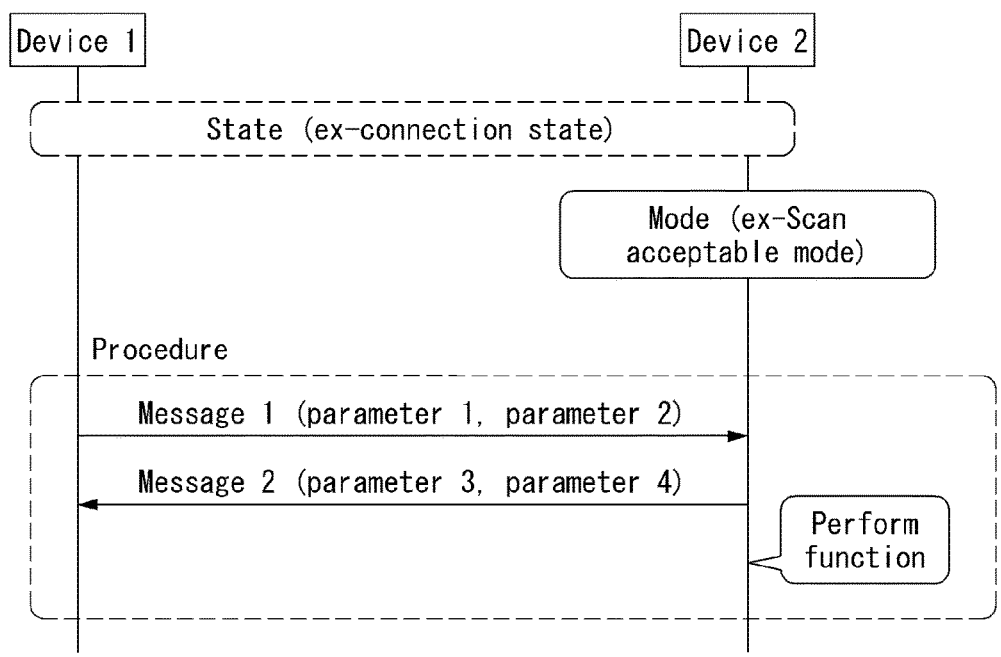
[FIG. 13]

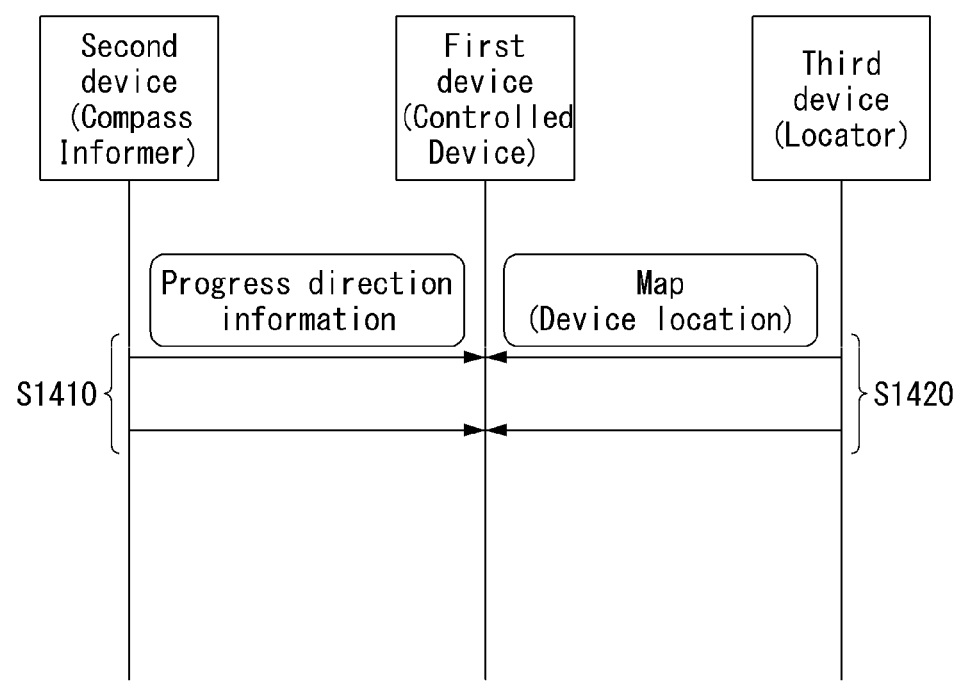
[FIG. 14]

[FIG. 15]
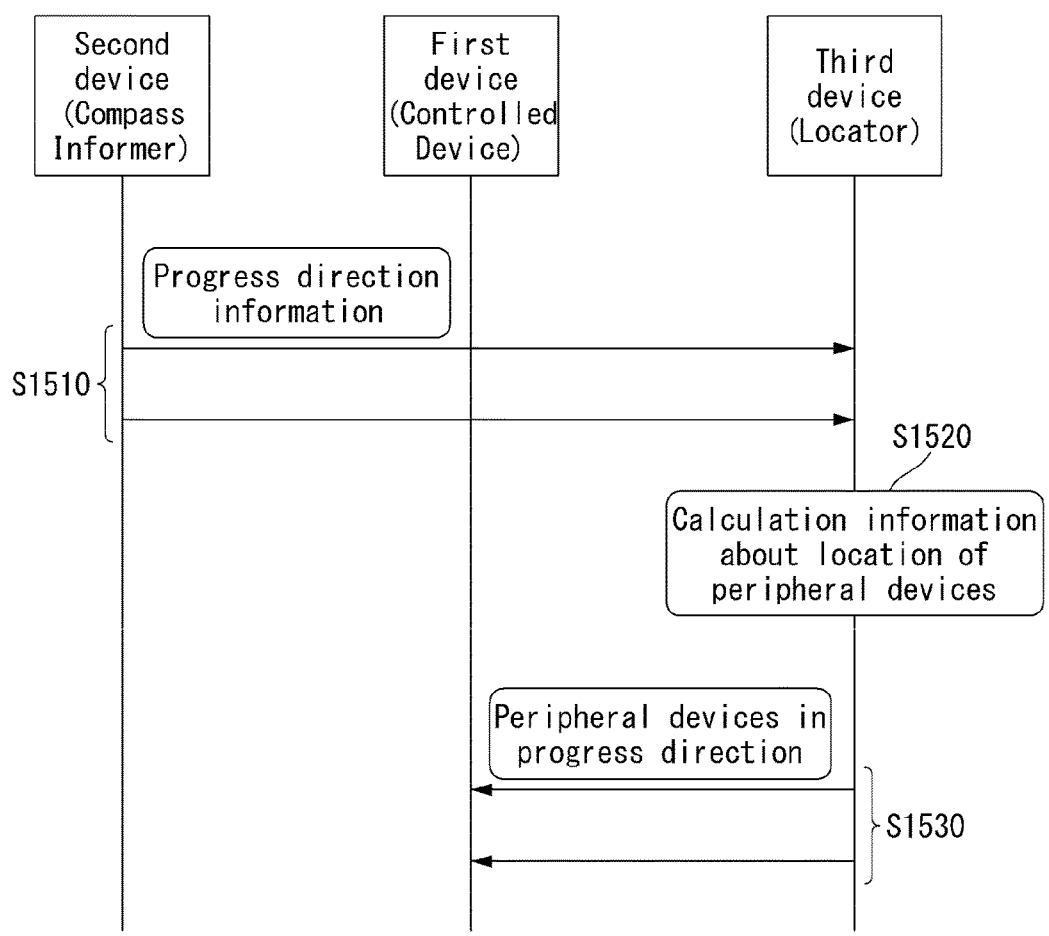

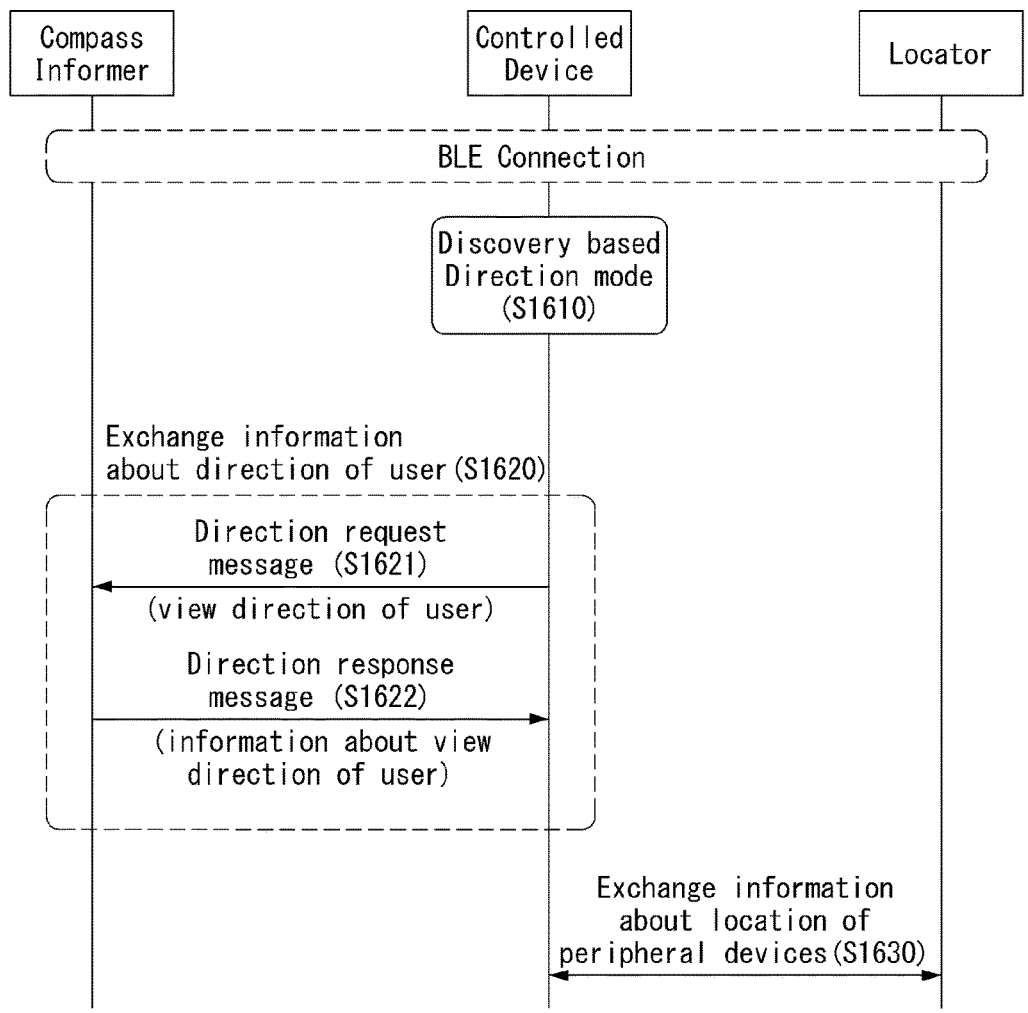

[FIG. 17]
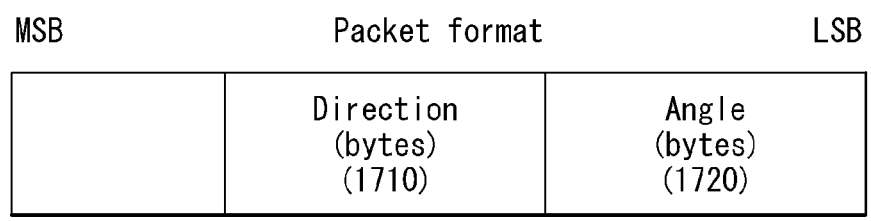

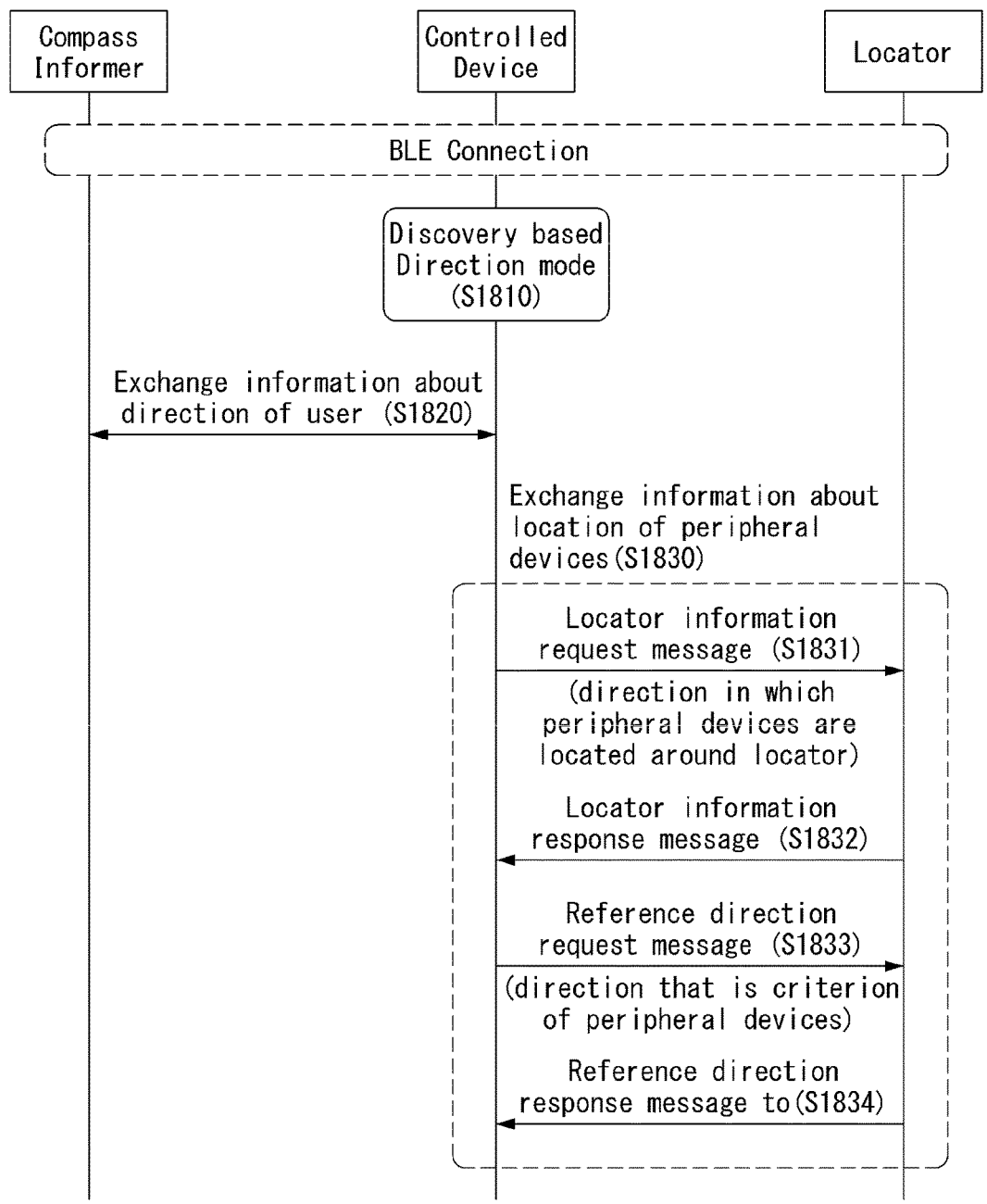
[FIG. 18]

[FIG. 19]
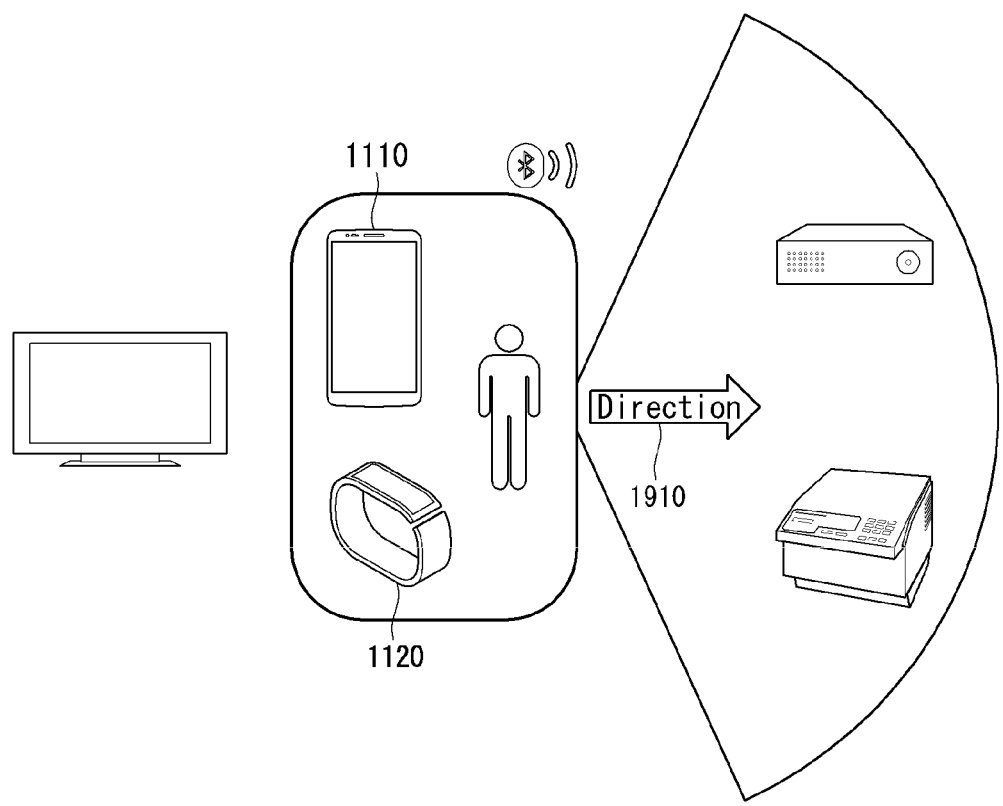

[FIG. 20]
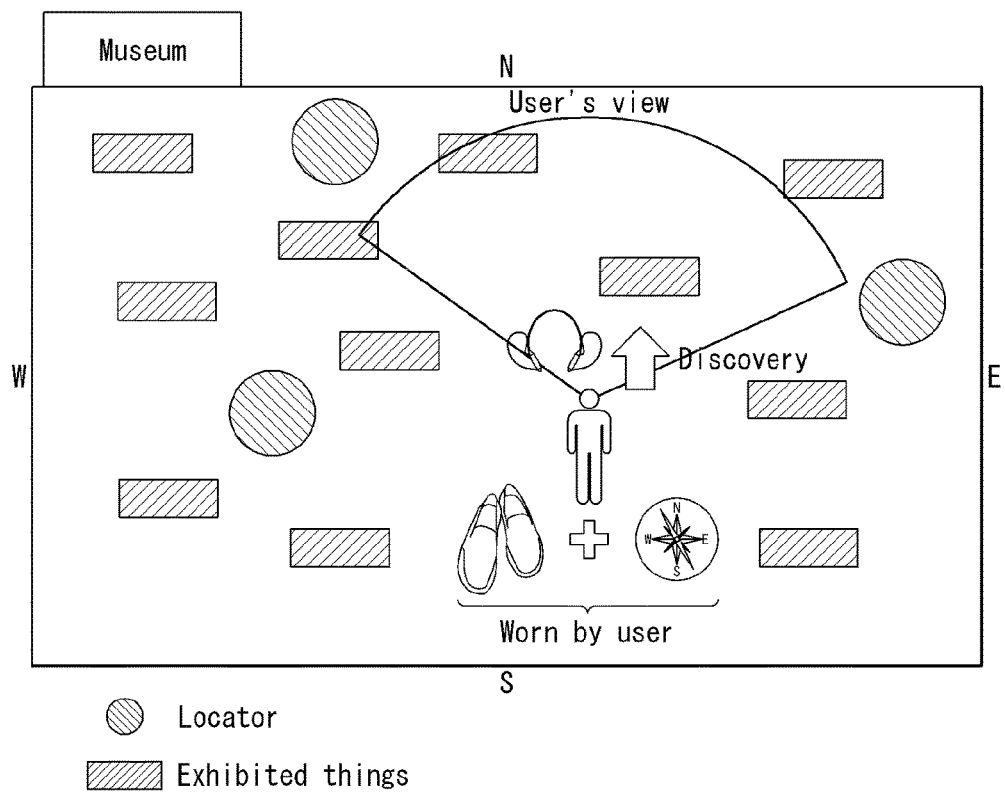

[FIG. 21]
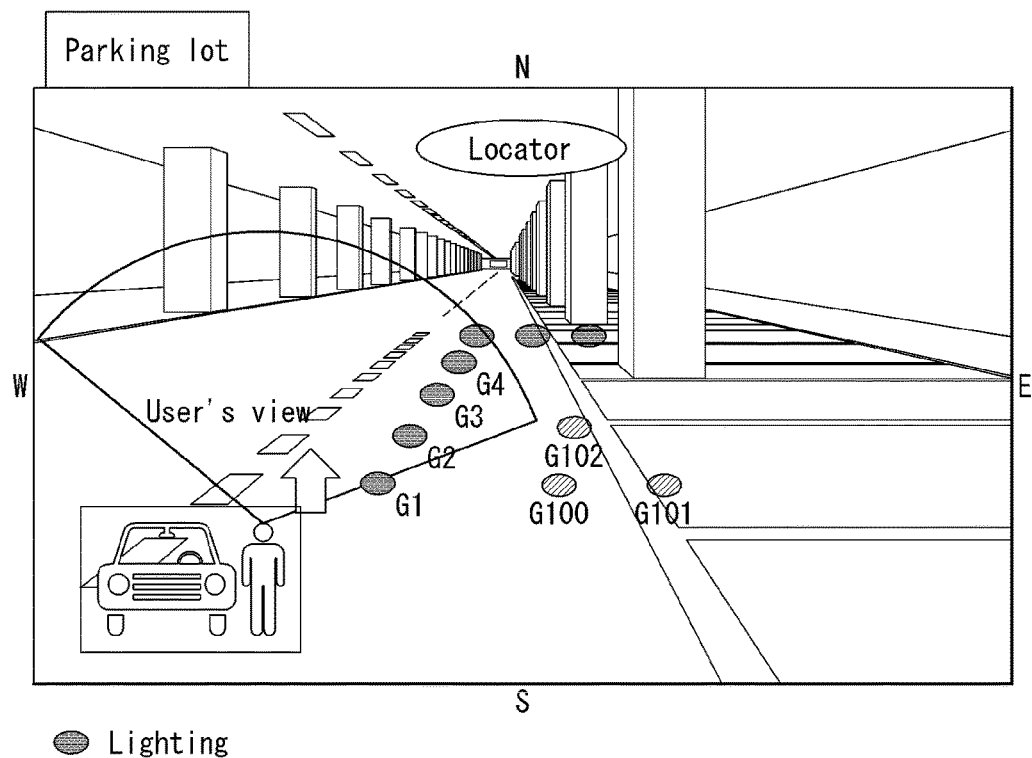
● Lighting
BLE Mesh Group A
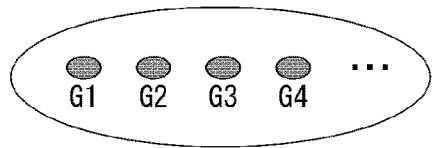
Lamp turned on
BLE Mesh Group B
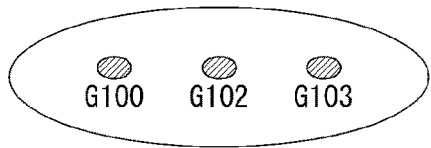
Lamp turned off

ND DEVICE THEREFOR

CROSS-REFERENCE TO RELATED APPLICATIONS

This application is the National Phase of PCT International Application No. PCT/KR2016/000586, filed on Jan. 20, 2016, which claims priority under 35 U.S.C. 119(e) to U.S. Provisional Application No. 62/105,704, filed on Jan. 20, 2015, all of which are hereby expressly incorporated by reference into the present application.

TECHNICAL FIELD

This specification relates to a wireless communication system and, more particularly, to a method of performing discovery using Bluetooth.

BACKGROUND ART

Bluetooth is one of typical short range wireless technologies for exchanging information among various devices such as smart phones, PCs, earphones, and headphones.

Bluetooth technology is now adopted by most of smart phones, PCs, and notebooks; and is widely used for the convenience of use. The easy pairing process of Bluetooth technology provides reliable connectivity among different devices. A recent Bluetooth variant LE is capable of providing hundreds of kilobytes of information reliably while requiring considerably reduced power consumption.

The Bluetooth Core Specification comprises BR/EDR (Basic Rate/Enhanced Data Rate) and LE (Low Energy) version.

Of the two versions, Bluetooth Low Energy (in what follows, it is called 'BLE') is a subset of Bluetooth Specification v4.0, aimed for high energy efficiency compared with the former Bluetooth specifications.

With the advent of the Internet of things (IoT) era, the number of devices carried by a user and the number of devices in the periphery of the user are greatly increased.

Accordingly, if connection and discovery with devices are performed using a wireless communication technology, many surrounding devices are discovered.

Although a user wants to discover only a device in front of the user, all of surrounding devices, that is, even surrounding devices located at the back or on the side, are discovered when the user performs discovery. This may cause unnecessary battery consumption and delay in device connection for a user device.

DISCLOSURE

Technical Problem

An object of this specification is to provide a method for discovering only a device present within a specific range using a direction detection sensor, such as a geomagnetic sensor, when a discovery procedure is to be performed.

In particular, an object of this specification is to provide a method for discovering only peripheral devices within a specific range (i.e., a user view direction) using a BLE technology capable of a simple connection between devices.

Technical objects of the present invention are not limited to those objects described above; other technical objects not mentioned above can be clearly understood from what are described below by those skilled in the art to which the present invention belongs.

Technical Solution

This specification provides a method for performing discovery in a wireless communication system, wherein the method is performed by a first device and includes turning on a direction-based discovery mode, obtains a first direction information related to a user from a second device, wherein the first direction information is information indicative of the progress direction of the user or the view direction of the user, exchanges a second direction information related to the locations of one or more peripheral devices with a third device, and performs discovery for a peripheral device existing in a specific direction among the peripheral devices based on the first direction information and the second direction information.

Furthermore, in this specification, the obtaining of the first direction information includes transmitting a direction request message for requesting the first direction information to the second device and receiving a direction response message from the second device in response to the direction request message.

Furthermore, in this specification, the exchanging the second direction information includes transmitting a location information request message for requesting the second direction information to the third device and receiving a location information response message from the third device in response to the location information request message.

Furthermore, in this specification, the discovery method further includes requesting reference direction information which is a criterion for determining the direction in which the peripheral devices are located to the third device and receiving the reference direction information from the third device.

Furthermore, in this specification, the first direction information and the second direction information include at least one of a direction parameter or a direction angle parameter.

Furthermore, in this specification, the obtaining the first direction information includes receiving the first direction information from the second device at specific time intervals.

Furthermore, in this specification, the second device is a geomagnetic sensor for measuring the first direction information or a device including the geomagnetic sensor.

Furthermore, in this specification, the direction parameter is one of north, south, east, west, northeast, northwest, southeast or southwest.

Furthermore, in this specification, the direction angle parameter has a value of 0 to 360 degrees.

Furthermore, in this specification, the peripheral devices include light-emitting diode (LED) lamps, and the LED lamps form a Bluetooth low energy (BLE) mesh group.

Furthermore, in this specification, the discovery method further includes performing BLE connection with an LED lamp in the view direction of the user, wherein the BLE-connected LED lamp exchanges information for indicating a specific direction with other lamps within the same BLE mesh group.

Furthermore, this specification provides a first device for performing discovery in a wireless communication system. The first device includes a communication unit for performing communication in a wireless or wired manner and a processor functionally connected to the communication unit. The processor turns on a direction-based discovery mode, obtains a first direction information related to a user from a second device, wherein the first direction information is information indicative of the progress direction of the user or the view direction of the user, exchanges a second direction information related to the locations of one or more peripheral devices with a third device, and performs control so that discovery is performed on a peripheral device existing in a specific direction among the peripheral devices based on the first direction information and the second direction information.

Advantageous Effects

This specification has an advantage in that it can improve user convenience because only devices within a specific range, that is, in the view direction of a user, can be discovered using information about the progress direction of the user and information about the direction of peripheral devices.

The advantageous effects that can be obtained from the present invention are not limited to those described above, and other effects not mentioned above can be understood clearly from the following descriptions by those skilled in the art to which the present invention belongs.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 illustrates one example of a wireless communication system which makes use of a Bluetooth low energy technology according to the present invention.

FIG. 2 illustrates one example of an internal block diagram of a server device and a client device capable of implementing methods of the present invention.

FIG. 3 illustrates one example of a Bluetooth low energy network topology.

FIGS. 4 and 5 illustrate one example of Bluetooth communication architecture to which methods according to the present invention can be applied.

FIG. 6 illustrates one example of a GATT Profile structure of the Bluetooth low energy specification.

FIG. 7 illustrates one example of a method for connection procedure of the Bluetooth low energy specification.

FIG. 8 is a flow diagram illustrating one example of a method for providing an object transfer service according to the Bluetooth low energy technology.

FIG. 9 is a flow diagram illustrating one example of a method for connection procedure according to the Bluetooth BR/EDR technology.

FIG. 10 is a diagram showing an example of a method for discovering a device.

FIG. 11 is a diagram showing an example of a schematic diagram of a system to which a method proposed in this specification may be applied.

FIG. 12 is a diagram showing an example of a device discovery method in which a progress direction has been taken into consideration, which is proposed in this specification.

FIG. 13 is a diagram showing an example of a method of performing scanning, which is proposed in this specification.

FIG. 14 is a diagram showing an example of a device discovery method based on a direction if BLE connection between devices has not been established, which is proposed in this specification.

FIG. 15 is a diagram showing another example of a device discovery method based on a direction if BLE connection between devices has not been established, which is proposed in this specification.

FIG. 16 is a diagram showing an example of a device discovery method based on a direction if BLE connection between devices has been established, which is proposed in this specification.

FIG. 17 is a diagram showing an example of the format of a packet proposed in this specification.

FIG. 18 is a diagram showing an example of a method of exchanging information about the locations of peripheral devices, which is proposed in this specification.

FIGS. 19 to 21 are diagrams showing examples of various situations to which the device discovery method based on a direction, which is proposed in this specification, are applied.

MODE FOR INVENTION

In what follows, the present invention will be described in more detail with reference to appended drawings.

A suffix such as "module" and "unit" introduced in the description below is assigned merely to facilitate description of this document, and the "module" and "unit" can be used interchangeably.

Meanwhile, a device according to this document refers to a device capable of wireless communication, including a mobile phone including a smartphone, tablet PC, desktop computer, notebook, and television including a smart TV and IPTV.

In what follows, embodiments of the present invention will be described in detail with reference to appended drawings and descriptions contained in the drawings, but the technical scope of the present invention is not restricted by the embodiments or limited to the embodiments.

Wherever possible, general terms widely used by the public have been chosen as long as the terms do not obscure their technical functions intended in the present invention; however, those terms can be changed by the intention of those skilled in the art, practices, or advent of a new technology.

In some case, specific terms are chosen arbitrarily; in that case, specific meaning of the corresponding terms will be elaborated at the corresponding description.

Therefore, the terms used in this document should be interpreted on the basis of their actual meaning and the description throughout the document rather than the immediate names of the terms.

FIG. 1 illustrates one example of a wireless communication system which makes use of a Bluetooth low energy technology according to the present invention.

The wireless communication system 100 comprises at least one server device 110 and at least one client device 120.

The server device and the client device perform Bluetooth communication by using Bluetooth Low Energy (in what follows, it is denoted as BLE for the purpose of convenience) technology.

First of all, compared with Bluetooth BR/EDR (Basic Rate/Enhanced Data Rate) technology, BLE technology requires a relatively small duty cycle. Products based on BLE technology can be manufactured at low costs and require considerably small power consumption through low speed data transmission rate; therefore, they can be operated more than one year with a coin cell battery.

Also, BLE technology simplifies a connection procedure between devices and requires a smaller packet size than Bluetooth BR/EDR technology.

Features of BLE technology can be summarized as follows: (1) the number of RF channels is 40, (2) the data transmission speed of 1 Mbps is supported, (3) star topology is used, (4) latency is 3 ms, (5) the maximum current is less than 15 mA, (6) the output power is less than 10 mW (10 dBm), and (7) main application fields include mobile phones, watch, sports, health-care, sensor, and device control.

The server device 110 can operate as a client device in a relationship with a different device, and similarly the client device can operate as a server device in a relationship with a different device. In other words, in the BLE communication system, a device can operate as a server device or a client device, and if needed, a device can operate as a server device and a client device at the same time.

The server device 110 can be called a data service device, master device, master, server, conductor, host device, audio source device, or first device. The client device can be called a slave device, slave, client, member, sink device, audio sink device, or second device.

The server device and the client device constitute a main part of the wireless communication system, and the wireless communication system can include other constituting elements in addition to the server device and the client device.

The server device refers to a device which receives data from a client, performs communication directly with the client device, and if receiving a data request from the client device, provides data to the client device through a response.

Also, the server device sends a notification message and indication message to the client device to provide data information to the client device. Also, when transmitting an indication message to the client device, the server device receives a confirm message corresponding to the indication message from the client device.

Also, the server device can provide data information to the user through a display unit or receive a request input from the user through a user input interface while transmitting and receiving a notification, indication, and confirm message to and from the client device.

Also, the server device can read data from a memory unit or write new data to the corresponding memory while transmitting and receiving a message to and from the client device.

Also, one server device can be connected to a plurality of client devices and can be easily re-connected to client devices by using bonding information.

The client device 120 refers to a device which requests data information and data transmission from a server device.

The client device receives data from the server device through a notification message and indication message and when receiving an indication message from the server device, sends a confirm message in response to the indication message.

In the same way as the server device, the client device can provide information to the user through a display unit or receive an input from the user through a user input interface while transmitting and receiving message to and from the server device.

Also, the client device can read data from a memory unit or write new data to the corresponding memory while transmitting and receiving a message to and from the server device.

Hardware components such as a display unit, user input interface, and memory unit of the server device and the client device will be described in detail with reference to FIG. 2.

Also, the wireless communication system can form a Personal Area Network (PAN) by using Bluetooth technology. As one example, the wireless communication system can exchange files and documents in a prompt and safe manner by forming a private piconet among devices.

A BLE device can operate to support various Bluetooth-related protocols, profiles, and processes.

FIG. 2 illustrates one example of an internal block diagram of a server device and a client device capable of implementing methods of the present invention.

A server device can be connected to at least one client device.

Also, depending on the needs, the internal block diagram of each device may further include other constituting elements (modules, blocks, or units), and part of the constituting elements of FIG. 2 may be omitted.

As shown in FIG. 2, a server device comprises a display unit 111, a user input interface 112, a power supply unit 113, a processor (or controller) 114, a memory unit 115, a Bluetooth interface 116, other interface 117, and a communication unit (or transmitting and receiving unit) 118.

The display unit 111, user input interface 112, power supply unit 113, processor 114, memory unit 115, Bluetooth interface 116, other interface 117, and communication unit 118 are functionally connected to each other to perform a method of the present invention.

Also, a client device comprises a display unit 121, a user input interface 122, a power supply unit 123, a processor 124, a memory unit 125, a Bluetooth interface 126, and a communication unit (or transmitting and receiving unit) 127.

The display unit 121, user input interface 122, power supply unit 123, processor 124, memory unit 125, Bluetooth interface 126, and communication unit 127 are functionally connected to each other to perform a method of the present invention.

The Bluetooth interface 116, 126 refers to a unit (or module) capable of transmitting a request/response, command, notification, indication/confirm message, or data between devices by using Bluetooth technology.

The memory 115, 125 is a unit implemented in various types of devices and refers to a unit to which various types of data are stored.

The processor 114, 124 refers to a module controlling the overall operation of the server device or the client device; and controls the server device or the client device to request transmission of a message through the Bluetooth interface or other interface and to process a received message.

The processor 114, 124 can be represented by a controller or a control unit.

The processor 114, 124 can include Application-Specific Integrated Circuit (ASIC), other chipsets, logical circuit and/or data processing device.

The memory 115, 125 can include ROM (Read-Only Memory), RAM (Random Access Memory), flash memory, memory card, storage medium and/or other storage device.

The communication unit 118, 127 can include baseband circuit for processing a radio signal. In case an embodiment is implemented in the form of software, the method described above can be implemented by a module (process or function) which performs the function described above. A module is stored in the memory and is carried out by the processor.

The memory 115, 125 can be installed inside or outside the processor 114, 124 and can be connected to the processor 114, 124 through various well-known means.

The display unit 111, 121 refers to the module for providing status information of a device and message exchange information to the user through a display.

The power supply unit 113, 123 refers to the module receiving external or internal power under the control of the controller and supplying power required for the operation of each individual element.

As described above, BLE technology is characterized by a small duty cycle and considerably reduces power consumption through a low data transmission rate; therefore, BLE technology is capable of supplying power required for the operation of each individual element even with small output power (which is less than 10 mW (10 dBm)).

The user input interface 112, 122 refers to the module which provides a user input such as a display button to the controller so that the user can control the operation of a device.

FIG. 3 illustrates one example of a Bluetooth low energy network topology.

With reference to FIG. 3, a device A corresponds to a piconet (piconet A, the shaded area) master having a device B and a device C as slaves.

At this time, a piconet refers to a set of devices where one from among a plurality of devices acts as a master and the others occupy a shared physical channel connected to the master device.

A BLE slave does not share the common physical channel with the master. Each slave communicates with the master through a separate physical channel. There is another piconet (piconet F) which consists of a master device F and a slave device G.

A device K belongs to a scatternet K. At this time, a scatternet refers to a group of piconets interconnected to each other.

A device K is a master of a device L and at the same time, a slave of a device M.

A device O also belongs to a scatternet O. The device O is a slave of a device P and at the same time, a slave of a device Q.

FIG. 3 illustrates a case where five different device groups are formed.

A device D is an advertiser, and a device A is an initiator (group D).

A device E is a scanner, and a device C is an advertiser (group C).

A device H is an advertiser, and a device I and a device J are scanners (group H).

The device K is also an advertiser, and a device N is an initiator (group K).

A device R is an advertiser, and the device O is an initiator (group R).

The device A and the device B use one BLE piconet physical channel.

The device A and the device C use another BLE piconet physical channel.

In group D, the device D advertises by using an advertisement event which can be connected on an advertising physical channel, and the device A is an initiator. The device A can establish a connection to the device D and add a device to the piconet A.

In group C, the device C advertises on an advertising physical channel by using a certain type of an advertisement event captured by the scanner device E.

The group D and the group C can utilize different advertising physical channels or different time frames to avoid collision.

The piconet F has one physical channel. The device F and the device G use one BLE piconet physical channel. The device F is a master, and the device G is a slave.

The group H has one physical channel. The device H, I, and J use one BLE advertising physical channel. The device H is an advertiser, and the device I and J are scanners.

In the scatternet K, the device K and L use one BLE piconet physical channel. The device K and M use another BLE piconet physical channel.

In group K, the device K advertises by using an advertisement event which can be connected to an advertising physical channel, and the device N is an initiator. The device N can establish a connection with the device K. At this time, the device K acts as a slave of two devices, and at the same time, a master of one device.

In the scatternet O, the device O and P use one BLE piconet physical channel. The device O and Q use another BLE piconet physical channel.

In group R, the device R advertises by using an advertisement event which can be connected to an advertising physical channel, and the device O is an initiator. The device O can establish a connection with the device R. At this time, the device O acts as a slave of two devices, and at the same time, a master of one device.

FIGS. 4 and 5 illustrate one example of Bluetooth communication architecture to which methods according to the present invention can be applied.

More specifically, FIG. 4 illustrates one example of Bluetooth BR (Basic Rate)/EDR (Enhanced Data Rate), and FIG. 5 illustrates one example of Bluetooth LE (Low Energy) architecture.

First, as shown in FIG. 4, Bluetooth BR/EDR architecture comprises a controller stack 410, HCI (Host Controller Interface) 420, and a host stack 430.

The controller stack (or controller module, 410) refers to the hardware for transmitting or receiving Bluetooth packets to and from a wireless transmission and reception module dealing with Bluetooth signals of 2.4 GHz; and comprises a BR/EDR Radio layer 411, BR/EDR Baseband layer 412, and BR/EDR Link Manager layer 413.

The BR/EDR Radio layer 411 transmits and receives a radio signal of 2.4 GHz and is capable of transmitting data by hopping 79 RF channels when Gaussian Frequency Shift Keying (GFSK) modulation is employed.

The BR/EDR baseband layer 412 transmits a digital signal, selects a channel sequence which performs hopping 1600 times per second, and transmits a time slot spanning 625 us for each channel.

The link manager layer 413 controls the overall operation of a Bluetooth connection such as link setup, control, and security by using Link Manager Protocol (LMP).

The link manager layer can perform the following functions.
- Control of ACL/SCO logical transport and logical link setup
- Detach: removes a connection and informs the corresponding device of the cause of the removal.
- Performs power control and role switch
- Performs a security function such as authentication, pairing, and encryption.

The host controller interface layer 420 provides an interface between a host module 430 and a controller module 410 so that a host can provide a command and data to a controller and the controller can provide an event and data to the host.

The host stack (or host module) 430 comprises L2CAP 437, Service Discovery Protocol (SDP) 433, BR/EDR protocol 432, BR/EDR profiles 431, Attribute Protocol 436, Generic Access Profile (GAP) 434, and Generic Attribute Profile (GATT) 435.

The Logical Link Control and Adaptation Protocol (L2CAP) 437 provides one bilateral channel for transmitting data according to a specific protocol or with a specific profile.

The L2CAP multiplexes various protocols and profiles provided by Bluetooth upper layers.

The L2CAP of the Bluetooth BR/EDR specification uses a dynamic channel; supports a protocol service multiplexer, retransmission, and streaming mode; and provides segmentation and reassembly, per-channel flow control, and error control.

The Service Discovery Protocol (SDP) 433 refers to the protocol used to search for a service (profile and protocol) that a Bluetooth service supports.

The BR/EDR protocols and profiles 432, 431 define a service employing the Bluetooth BR/EDR specification and an application protocol according to which exchange of data is performed.

The Attribute Protocol 436 relies on a server-client structure, which defines rules for the corresponding device to access data. Six message types are defined as shown below: Request message, Response message, Command message, Notification message, and Indication message.

Request message from client to server with Response message from server to client
Command message from client to server without Response message
Notification message from server to client without Confirm message
Indication message from server to client with Confirm message from client to server The Generic Attribute Profile (GATT) 435 defines an attribute type.

The Generic Access Profile (GAP), 434 defines a method for discovering and connecting a device; and a method for providing information to a user. The GAP provides a privacy scheme.

As shown in FIG. 5, the BLE structure comprises a controller stack capable of processing a wireless device interface for which timing is critical and a host stack capable of processing high level data.

The controller stack may be called a controller, but in order to avoid being confused with the processor which is an internal element of a device described earlier in FIG. 2, the name of the controller stack is preferred in what follows.

First, the controller stack can be implemented by using a communication module which can include a Bluetooth wireless device and a processor module which can include a processing device such as a microprocessor.

The host stack can be implemented as part of the OS operating on the processor module or as a package instance on the OS.

In some cases, the controller stack and the host stack can be operated or carried out on the same processing device within the processor module.

The host stack comprises Generic Access Profile (GAP) 510, GATT based Profiles 520, Generic Attribute Profile (GATT) 530, Attribute Protocol (ATT) 540, Security Manager (SM) 550, and Logical Link Control and Adaptation Protocol (L2CAP) 560. The host stack is not limited to the aforementioned composition, but can include various protocols and profiles.

By using the L2CAP, the host stack multiplexes various protocols and profiles that Bluetooth specification provides.

First, the L2CAP 560 provides one bilateral channel for transmitting data to according to a specific protocol or with a specific profile.

The L2CAP is capable of multiplexing data among upper layer protocols, segmenting or reassembling packages, and managing multicast data transmission.

BLE uses three fixed channels: one for signaling, another for the security manager, and the third for the attribute protocol.

On the other hand, BR/EDR (Basic Rate/Enhanced Data Rate) uses a dynamic channel and supports protocol service multiplexer, retransmission, streaming mode.

The Security Manager (SM) 550 authenticates a device, which is a protocol for providing key distribution.

The Attribute Protocol (ATT) 540 relies on a server-client structure, which defines rules for the corresponding device to access data. Six message types are defined: Request, Response, Command, Notification, Indication, and Confirmation.

① Request and Response message: Request message is used when a client device requests specific information from a server device, and Response message is used in response to the Request message, which is transmitted from the server device to the client device.

② Command message: It is transmitted from the client device to the server device to indicate a command for specific operation, but the server device does not transmit a response to the Command message to the client device.

③ Notification message: The server device transmits this message to the client device to notify of an event, but the client device does not transmit a confirmation message with respect to the Notification message to the server.

④ Indication and Confirm message: the server device transmits this message to the client device to notify of an event. Different from the Notification message, the client device transmits a Confirm message with respect to the Indication message to the server device.

The Generic Access Profile (GAP) is the layer newly implemented to support BLE technology and is used to control selection of roles for communication among BLE devices and the procedure of multi-profile operation.

The GAP is used mainly for device discovery, connection establishment, and security; defines a method for providing information to a user; and defines the following attribute types.

① Service: a combination of behaviors related to data. Defines basic operation of a device.
② Include: defines a relationship between services.
③ Characteristics: a data value used by a service
④ Behavior: a format that can be readable by a computer, which is defined by Universal Unique Identifier (UUID) and a value type.

GATT-based profiles are dependent on the GATT and are applied mainly for BLE devices. The GATT-based profiles may include Battery, Time, FindMe, Proximity, Object Delivery Service, and so on. More specific descriptions of the GATT-based profiles are as follows.

Battery: method for exchanging battery information.
Time: method for exchanging time information.
FindMe: provides an alarm service according to a distance.
Proximity: method for exchanging battery information.

The GATT can be used as a protocol by which to describe how ATT is utilized at the time of composing services. For example, the GATT can be used to define how ATT profiles are grouped together with services and to describe characteristics associated with the services.

Therefore, GATT and ATT describe device states and services; and how features are associated with each other and how they are used.

The controller stack comprises a physical layer 590, link layer 580, and host controller interface 570.

The physical layer (wireless transmission and reception module 590) transmits and receives a radio signal of 2.4 GHz; and uses Gaussian Frequency Shift Keying (GFSK) modulation and frequency hopping utilizing 40 RF channels.

The link layer 580 transmits or receives Bluetooth packets.

Also, the link layer establishes a connection between devices after performing the advertising and scanning function by using three advertising channels; and provides a function of exchanging a maximum of 42 bytes of data packets through 37 data channels.

The Host Controller Interface (HCI) provides an interface between the host stack and the controller stack so that the host stack can provides commands and data to the controller stack and the controller stack can provide events and data to the host stack.

In what follows, the procedure of Bluetooth Low Energy (BLE) will be described briefly.

The BLE procedure comprises a device filtering procedure, advertising procedure, scanning procedure, discovering procedure, and connecting procedure.

Device Filtering Procedure

The device filtering procedure is intended to reduce the number of devices performing a response to a request, command, or notification in the controller stack.

It is not necessarily required for all of the devices to respond to a received request; therefore, the controller stack reduces the number of transmitted requests so that power consumption can be reduced in the BLE controller stack.

An advertising device or a scanning device can perform the device filtering procedure to restrict devices which receive advertisement packets, scan request, or connection request.

At this time, an advertising device refers to a device which transmits an advertisement event, namely a device which performs advertisement and is also called an advertiser.

A scanning device refers to a device which performs scanning, namely a device which transmits a scan request.

In the BLE specification, if a scanning device receives part of advertisement packets from an advertising device, the scanning device has to transmit a scan request to the advertising device.

However, in case transmission of a scan request is not required as the device filtering procedure is employed, the scanning device can ignore advertisement packets transmitted from an advertising device.

The device filtering procedure can be used even in the connection request procedure. If device filtering is used for the connection request procedure, the need for transmitting a response to a connection request can be made unnecessary by ignoring the connection request.

Advertising Procedure

An advertising device performs an advertisement procedure to perform non-directional broadcast by using the devices within the range of the advertising device.

At this time, non-directional broadcast refers to the broadcast in all directions rather than the broadcast in specific directions.

Different from the non-directional broadcast, directional broadcast refers to the broadcast in a specific direction. Non-directional broadcast is performed without involving a connection procedure between devices in a listening state (in what follows, they are called listening deives).

The advertising procedure is used to establish a Bluetooth connection to a nearby initiating device.

Or the advertising procedure can be used to provide periodic broadcast of user data to the scanning devices performing listening through an advertising channel.

In the advertising procedure, all of the advertisement (or advertisement events) are broadcast through an advertising physical channel.

Advertising devices can receive scan requests from listening devices performing the listening operation to obtain additional user data from advertising devices. An advertising device transmits a response with respect to the scan request to the device which has transmitted the scan request through the same advertising physical channel through which the advertising device has received the scan request.

While the broadcast user data sent as part of advertising packets form dynamic data, the scan response data are static for the most part.

An advertising device can receive a connection request from an initiating device on the advertising (broadcast) physical channel. If the advertising device has used a connectable advertisement event and the initiating device has not been filtered by the filtering procedure, the advertising device stops advertisement and enters a connected mode. The advertising device can resume advertisement after entering the connected mode.

Scanning Procedure

A device performing scan operation, namely a scanning device performs a scanning procedure to listen to non-directional broadcast of user data from advertising devices which use an advertising physical channel.

To request additional user data, the scanning device transmits a scan request to an advertising device through the advertising physical channel. The advertising device transmits a scan response with respect to the scan request through the advertising physical channel by including additional user data that the scanning device has requested.

The scanning procedure can be used while the scanning device is being connected to another BLE device in a BLE piconet.

If the scanning device receives a broadcast advertising event and stays in an initiator mode where a connection request can be initiated, the scanning device can initiate a Bluetooth connection to an advertising device by sending a connection request to the advertising device through the advertising physical channel.

If the scanning device transmits a connection request to the advertising device, the scanning device stops all the scanning for additional broadcast and enters the connected mode.

Discovering Procedure

Devices capable of Bluetooth communication (in what follows, they are called 'Bluetooth devices') perform the advertising procedure and the scanning procedure to discover devices in the surroundings of the devices or to be discovered by other devices within a given area.

The discovering procedure is performed in an asymmetric manner. A Bluetooth device searching for another Bluetooth device in the surroundings is called a discovering device and performs listening to search for devices advertising an advertisement event that can be scanned. A Bluetooth device that can be found and used by another device is called a discoverable device, and the discoverable device actively broadcasts an advertisement event so that other devices can scan the discoverable device through an advertising (broadcast) physical channel.

Both of the discovering device and the discoverable device may be already connected to other Bluetooth devices in a piconet.

Connecting Procedure

The connecting procedure is asymmetric. In the connecting procedure, while a particular Bluetooth device is performing the advertising procedure, other Bluetooth devices are required to perform the scanning procedure.

In other words, the advertising procedure can be a primary task to be performed, and as a result, only one device will respond to the advertisement. After receiving a connectable advertisement event from an advertising device, the connecting procedure can be initiated by sending a connection request to the advertising device through the advertising (broadcast) physical channel.

Next, operation states defined in the BLE technology, namely advertising state, scanning state, initiating state, and connection state will be described briefly.

Advertising State

The link layer (LL) enters the advertising state by the command of the host (stack). In case the link layer is in the advertising state, the link layer transmits advertising Packet Data Units (PDUs) from advertisement events.

Each advertisement event comprises at least one advertising PDU, and advertising PDUs are transmitted through advertising channel indices used. Each advertisement event can be closed earlier in case advertising PDUs are transmitted through the respective advertising channel indices, the advertising PDUs are terminated, or the advertising device needs to secure space to perform other functions.

Scanning State

The link layer enters the scanning state by the command of the host (stack). In the scanning state, the link layer listens to advertising channel indices.

The scanning state supports two types: passive and active scanning. The host determines scanning type.

No separate time or advertising channel index is defined to perform scanning.

While in the scanning state, the link layer listens to the advertising channel index for the duration of scanWindow. A scan Interval is defined as an interval between start points of two consecutive scan windows.

When there is no scheduling collision, the link layer has to perform listening to complete all of the scanIntervals of scanWindows as commanded by the host. In each scanWindow, the link layer has to scan other advertising channel indices. The link layer uses all of the advertising channel indices available.

In the case of passive scanning, the link layer is unable to transmit any packet but only receives packets.

In the case of active scanning, the link layer performs listening to the advertising device to rely on the advertising PDU type by which additional information related to the advertising PDUs and advertising device can be requested.

Initiating State

The link layer enters the initiating state by the command of the host (stack).

While in the initiating state, the link layer performs listening to the advertising channel indices.

While in the initiating state, the link layer listens to the advertising channel index for the duration of scanWindow.

Connection State

The link layer enters the connection state when a device performing a connection request, namely the initiating device transmits the CONNECT_REQ PDU to an advertising device or the advertising device receives the CONNECT_REQ PDU from the initiating device.

Establishing a connection is taken into account after the link layer enters the connection state. However, there is no need to take into account establishing a connection at the time the link layer enters the connection state. The only difference between a newly created connection and a pre-existing connection is a supervision timeout value for link layer connection.

When two devices are connected to each other, the two devices perform the respective roles different from each other.

The link layer performing the role of the master is called a master, while the link layer performing the role of the slave is called a slave. The master adjusts the timing of a connection event, where the connection event denotes the time at which the mast and the slave are synchronized with each other.

A master (central) is such a device that periodically scans a connectable advertising signal to establish a connection to other device (slave, peripheral) and requests an appropriate device to establish a connection.

Also, once connected to a slave device, the master device sets up timing and supervises periodic data exchange.

At this time, the timing can be a hopping rule applied to two device to exchange data each time through the same channel.

A slave (peripheral) is such a device that periodically transmits a connectable advertising signal to establish a connection with other device (master).

Therefore, if a master device which has received the connectable advertising signal sends a connection request, the slave device accepts the request and establishes a connection with the master device.

After the slave device establishes a connection with the master device, the slave device exchanges data periodically by hopping a channel according to the timing specified by the master device.

In what follows, the packet defined in the Bluetooth interface will be described briefly. BLE devices use the packets described below.

Packet Format

The link layer has only one packet format used for both of the advertising channel packet and data channel packet.

Each packet comprises four fields: a preamble, access address, PDU, and CRC.

When one packet is transmitted from the advertising physical channel, the PDU will function as an advertising channel PDU; when one packet is transmitted from the data physical channel, the PDU will function as a data channel PDU.

Advertising Channel PDU

The advertising channel PDU comprises a 16 bit header and a payload of various size.

The PDU type filed of the advertising channel included in the header supports PDU types as defined in Table 1 below.

TABLE 1

| PDU Type | PACKet Name |
|---|---|
| 0000 | ADV-IND |
| 0001 | ADV_DIRECT_IND |
| 0010 | ADV_NONCONN_IND |

TABLE 1-continued

| PDU Type | PACKet Name |
|---|---|
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising

PDUs and are used for specific events.

ADV_IND: connectable non-directional advertisement event

ADV_DIREC_IND: connectable directional advertisement event

ADV_NONCONN_IND: non-connectable non-directional advertisement event

ADV_SCAN_IND: non-directional advertisement event that can be scanned

The PDUs are transmitted from the link layer in the advertising state and are received by the link layer in the scanning state or initiating state.

Scanning PDUs

The advertising channel PDU type below is called a scanning PDU and is used in such a state described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDUs

The data channel PDU comprises a 16 bit header and a payload of various size; and can include a Message Integrity Check (MIC) field.

The procedures, states, and packet formats of the BLE technology descried above can be applied to perform the methods according to the present invention.

In what follows, the connection procedure defined in the BLE technology will be described briefly and as one example of the connection procedure, a method for providing an object transmission service according to the BLE specification will be described.

FIG. 6 illustrates one example of a GATT Profile structure of the Bluetooth low energy specification.

With reference to FIG. 6, one can see the structure for exchanging profile data defined in the Bluetooth low energy specification.

More specifically, GATT (Generic Attribute Profile) defines a method for exchanging data by using a service between Bluetooth LE devices and characteristics thereof.

In general, a peripheral device (for example, a sensor device) performs the role of a GATT server and carries a definition for the service and characteristics.

To read or write data, a GATT client sends a data request to the GATT server; the GATT client initiates all of the transactions and receives a response from the GATT server.

The GATT-based operational structure defined in the Bluetooth LE is based on profiles, services, and characteristics, which form a hierarchical structure as shown in FIG. 6.

The profile can consist of one or more services, and the service can consist of one or more characteristics or other services.

The service groups data into logical units and includes one or more characteristics or other services.

Each service has an identifier of 16 bits or 128 bits, called a Universal Unique Identifier (UUID).

The characteristic forms the lowest unit in the GATT-based operational structure. The characteristic contain only one piece of data and similarly to the service, has a UUID of 16 bits or 128 bits.

The characteristic includes descriptors for various types of information and requires one attribute to describe each individual information. The characteristic can use a couple of consecutive attributes.

The attribute comprises four constituting elements as follows.

handle: address of the attribute
Type: type of the attribute
Value: value of the attribute
Permission: access right to the attribute In what follows, a connection procedure in the Bluetooth LE will be described, and as one example thereof, a method for providing an object transfer service according to the Bluetooth LE will be described.

FIG. 7 illustrates one example of a method for connection procedure of the Bluetooth low energy specification.

A server transmits an advertisement message through three advertisement channels S710.

The server can be called an advertiser before connection is established and can be called a master after connection is established. Examples of the server include sensors (for example, temperature sensors).

Also, the client can be called a scanner before connection is established and can be called a slave after connection is established. An example of the client is a smartphone.

As described above, Bluetooth communication employs a total of 40 channels through the frequency of 2.4 GHz. Of the 40 channels, 3 channels are advertisement channels, used for exchanging packets to establish a connection as well as various advertising packets.

The remaining 37 channels are data channels, used for exchange of data packets after connection is established.

After receiving the advertisement message, the client can transmit a scan request to the server to obtain additional data (for example, a server device name) from the server.

Then the server transmits a scan response along with the remaining data to the client in response to the scan request.

At this time, the scan request and the scan response are one type of an advertisement packet which can include only user data of 31 bytes or less.

Therefore, in case data size is larger than 31 bytes but with large overhead from established connection to send data, the data are divided into two blocks and transmitted twice by using the scan request/scan response.

Next, the client transmits to the server a connection request for establishing a Bluetooth connection with the server S720.

Through the aforementioned step, a link layer (LL) connection is established between the server and the client.

Afterwards, the server and the client perform a security establishment procedure.

The security establishment procedure can be interpreted as secure simple pairing or can be performed with the secure simple pairing being included therein.

In other words, the security establishment procedure can be performed through phase 1 to phase 3.

More specifically, a pairing procedure (phase 1) is carried out between a server and a client S730.

Through the pairing procedure, the client transmits a pairing request to the server, and the server transmits a pairing response to the client.

Next, in the phase 2, legacy pairing or secure connection is carried out between the server and the client S740.

Next, in the SSP phase 3, a key distribution procedure is carried out between the server and the client S750.

Through the phases, a secure connection is established between the server and the client, and encrypted data can be transmitted and received.

FIG. 8 is a flow diagram illustrating one example of a method for providing an object transfer service according to the Bluetooth low energy technology.

An object delivery service or object transfer service refers to a service supported by the BLE to transmit/receive an object such as bulk data or data in the Bluetooth communication.

To establish a Bluetooth connection between a server device and a client device, an advertisement process and a scanning process corresponding to S810 to S830 steps are carried out.

First, the server device transmits an advertisement message to the client device to inform of the information related to the server device including an object transfer service S810.

The advertisement message can be expressed as an advertisement packet data unit (PDU), advertisement packet, advertisement, advertisement frame, or advertisement physical channel PDU.

The advertisement message can include service information (including a service name) provided by the server device, name of the server device, and manufacturer data.

Also, the advertisement message can be transmitted to the client device according to the broadcast or unicast scheme.

Afterwards, the client device transmit a scan request message to the server device to figure out detailed information related to the server device S820.

The scan request message can be expressed as a scanning PDU, scan request PDU, scan request, scan request frame, or scan request packet.

Afterwards, the server device transmits a scan response message to the client device in response to the scan request message received from the client device S830.

The scan response message includes server device-related information requested by the client device. At this time the server device-related information may be an object or data that can be transmitted from the server device in association with provision of the object transfer service.

In case the advertisement process and the scanning process are terminated, the server device and the client device perform an initiating connection process and data exchange process corresponding to S840 to S870 steps.

More specifically, the client device transmits a connection request message to the server device to establish a Bluetooth communication connection with the server device S840.

The connection request message can be expressed as a connection request PDU, initiation PDU, connection request frame, or connection request.

Through the S840 step, a Bluetooth connection is established between the server device and the client device, after which the server device and the client device exchange data with each other. During the data exchange process, data can be transmitted and received through the data channel PDU.

The client device transmits an object data request to the server device through the data channel PDU S850. The data channel PDU can be expressed as a data request message or data request frame.

Afterwards, the server device transmits object data requested by the client device to the client device through the data channel PDU S860.

At this time, the data channel PDU is used for providing data to a corresponding device or requesting data information according to the scheme defined in the attribute protocol.

Next, in case data change occurs in the server device, the server device transmits data changed indication information to the client device through the data channel PDU to notify of change of data or object S870.

Next, the client device requests changed object information from the server device to search for changed data or changed object S880.

Next, the server device transmits changed object information to the client device in response to the request for changed object information S890.

Next, the client device searches for a changed object through a comparative analysis of the received changed object information and the object information that the client device currently has.

However, the client device performs S880 and S890 step repeatedly until a changed object or data are found.

Next, in case it is not required to maintain a connected state between the host device and the client device any more, the host device or the client device can disconnect the corresponding connected state.

FIG. 9 is a flow diagram illustrating one example of a method for connection procedure according to the Bluetooth BR/EDR technology.

As shown in FIG. 9, the connection procedure defined in the Bluetooth BR/EDR consists of the following steps.

The connection procedure may be referred to as a pairing procedure.

The Bluetooth pairing procedure is described only by a standby state and a connected state.

The device which has completed Bluetooth pairing enters the connected state, and the device which has ended a connection operates in the standby state.

Also, Bluetooth devices, once connected to a specific device through the connection procedure, can perform a re-connection procedure to establish re-connection afterwards.

The re-connection procedure can be performed through the same procedure as the connection procedure.

More specifically, if power is applied, a master device enters the standby state by default.

Afterwards, the master device performs an inquiry procedure S911 to discover neighboring devices for Bluetooth connection.

In other words, the master device can enter an inquiry state to discover connectable devices (slaves) in the surroundings thereof, and a slave device can enter an inquiry scan state to receive an ID packet transmitted from a neighboring device (master) in the inquiry state.

The master device in the inquiry state transmits an inquiry message by using the ID packet once or at regular intervals to discover a connectable device in the neighborhood.

The ID packet can be a general inquiry access code (GIAC) or a dedicated inquiry access code (DIAC).

After receiving GIAC or DIAC, an ID packet that the master device has transmitted, the slave device transmits a frequency hopping sequence (FHS) to perform Bluetooth pairing with the master device.

Also, depending on the needs, if there are data to transmit, the slave device can transmit an extended inquiry response (hereinafter, it is called EIR) to the master device.

If a connectable Bluetooth device is found in the neighborhood through the inquiry procedure, a paging procedure S912 is carried out.

The paging procedure S912 refers to the procedure of performing actual connection by synchronizing a hopping sequence by using an address, clock information, and so on if a connectable Bluetooth device is found in the neighborhood through the inquiry procedure.

More specifically, the paging procedure can be divided into the following steps: (1) a step wherein the master device transmits a page to the slave device, (2) a step wherein the slave device transmits a slave page response to the master device, and (3) a step wherein the master device transmits a master page response to the slave device.

If the inquiry procedure and the paging procedure are completed, the master device and the slave device perform a security establishment step S914 and then L2CAP connection and service discovery step S915.

Before performing the security establishment step, the master device and the slave device exchange I/O (Input/Output) capabilities with each other S913.

The S913 step can be performed through an I/O capability request and I/O capability response.

Also, the security establishment step can be interpreted as secure simple pairing or can be performed with the secure simple pairing being included therein.

The L2CAP (Logical Link Control and Adaptation Protocol) is a packet-based protocol, exhibiting characteristics similar to the UDP protocol. The L2CAP supports a packet size of 672 bytes and is capable of supporting up to 65,535 bytes once communication is initiated.

After performing the L2CAP connection and service discovery step, the master device can transmit data received from the user to the slave device S916.

If no further data exchange is performed for a predetermined time period between the master and the slave device which have performed the connection procedure as described above, the master and the slave devices enters a sleep state to prevent energy consumption, and the connected state is terminated.

Afterwards, a re-connection procedure is performed so that the master device and the slave device can transmit/receive data again.

The re-connection procedure can be performed through the same procedure as the one described earlier.

Hereinafter, an existing method of discovering a device (or equipment or apparatus) using Bluetooth is described in brief. A device discovery method based on a direction, which is proposed in this specification, is described in detail.

FIG. 10 is a diagram showing an example of a method for discovering a device.

Referring to FIG. 10, when a user device detects that BLE has been on in response to user input or according to a specific condition, the user device performs discovery on all of surrounding devices.

As in FIG. 10, however, what the user device performs discovery on all of devices present in the periphery of the user device may be unnecessary in terms of battery consumption and the time taken for discovery.

If the user device performs discovery on only specific devices to be discovered (i.e., devices located in a specific area around the user device), a more useful effect, such as improved user convenience, may be obtained.

As shown in FIG. 10, the area where the user device can perform discovery may be divided into (1) an area 1010 where a user wants to perform discovery and (2) an area 1020 where the user does not want to perform discovery.

The area where the user wants to perform (device) discovery may be expressed as an area within the range of a user view.

Hereinafter, a method of performing device discovery based on direction, which is proposed in this specification, is described in detail.

Device discovery based on direction refers to discovering a device by taking into consideration the progress direction of a user or the view direction of a user.

A method proposed in this specification may be basically divided into (1) a system model for device discovery based on direction, (2) a method of defining an information exchange procedure, parameters, a mode and a message for checking the progress direction of a user (or the view direction of the user) and (3) a method of defining an information exchange procedure, parameters, a mode and a message for obtaining the location and direction of peripheral devices.

First, the system configuration (or system model) for device discovery based on direction is described.

If BLE connection has been established between devices, a user device can discover only devices within the view of the user when performing discovery by calculating the progress direction of the user and the location and direction of peripheral devices.

Specifically, a user device may obtain information about the direction in which a user proceeds or the view direction of the user through a geomagnetic sensor.

The geomagnetic sensor is included in a specific object carried by the user. An example of the specific object may be a shoe, clothes, a watch or the like.

A locator refers to a device which plays the role of providing a user device with information about the location of devices located in the periphery of the user (or user device) and reference direction information by which corresponding location information may be aware.

The locator and an object including the (geomagnetic) sensor may be implemented into a single device or implemented as separate devices. Methods proposed in this specification may be applied to the single device or the separate devices.

Furthermore, although BLE connection between devices has not been established, the (geomagnetic) sensor and the locator may provide a user device with direction information (i.e., information about the progress direction of the user and the direction of peripheral devices) in advance at specific time intervals.

Accordingly, the user device may discover only devices within the view of the user (or user device) if it performs a discovery procedure.

A procedure, parameters, a mode and a message which may be newly defined in order to exchange information about the progress direction of a user is described below.

In order to distinguish information about the direction of peripheral devices from information about the progress direction of a user, the progress direction of the user may be expressed as a first direction, and the direction of peripheral devices may be expressed as a second direction.

This method is a procedure for a user device to obtain first direction information (i.e., information about the progress direction of the user or the view direction of the user) through a geomagnetic sensor.

For example, a geomagnetic sensor or an object including a geomagnetic sensor notifies a user device or locator of whether the progress direction of the user or the view direction of the user is the north or the southwest.

To this end, the user device and the geomagnetic sensor (or the object including a geomagnetic sensor) exchange a request message and response message related to the progress direction.

The geomagnetic sensor or the object including a geomagnetic sensor may be expressed as a direction providing device.

Furthermore, prior to BLE connection between devices, the direction providing device may previously notify a user device of the progress direction of the user in advance at specific time intervals (before the user device requests information about a progress direction) or may directly provide a locator with information related to the progress direction of the user.

The request message or response message related to the progress direction may include a direction angle parameter and a direction parameter.

The direction angle parameter indicates a direction angle value of 0 to 360 degrees.

Furthermore, the direction parameter indicates a direction value, such as the east, west, south, north, northwest, northeast, southeast or southwest.

Furthermore, a mode parameter is set in a user device for device discovery based on direction and may be expressed as a discovery mode based on a direction.

A user device may receive information related to the location and direction of peripheral devices by switching to a corresponding mode or turning on the corresponding mode.

A method of defining a procedure of exchanging reference direction information, parameters, a mode and a message is described below.

This method relates to a procedure of providing notification of a reference direction, that is, a criterion for a direction related to the location of devices located in the periphery of user devices, through a locator using a location-based service.

That is, when the location of peripheral devices is notified, the method is related to a procedure of providing notification of whether a reference direction is the north or the northwest.

Likewise, messages (i.e., a request message and a response message) transmitted and received to exchange reference direction information may include a direction angle parameter and a direction parameter.

The direction angle parameter is a value indicative of a direction angle of 0 to 360 degrees.

Furthermore, the direction parameter is a value indicative of a direction, such as the east, west, south, north, northwest, northeast, southeast or southwest.

Furthermore, the mode parameter is set in a user device in order to exchange information related to the location and direction of peripheral devices, and may be expressed as a discovery mode based on a direction.

A user device may receive information related to the location and direction of peripheral devices by turning on a corresponding mode.

FIG. 11 is a diagram showing an example of a schematic diagram of a system to which a method proposed in this specification may be applied.

Referring to FIG. 11, the system 1100 proposed in this specification may include a user device (first device) 1110, a direction providing device (second device) 1120, and a locator (third device) 1130.

The direction providing device includes a geomagnetic sensor and may mean a specific object carried by a user.

The devices forming the system are interconnected through a network interface, such as Bluetooth.

The network interface is a mechanism for efficiently discovering a specific device and may indicate a device for performing low energy wireless communication, such as Bluetooth low energy (BLE).

The user device may discover devices within a specific range, that is, only devices in the direction watched by the user, through the network interface.

When the user device discovers peripheral devices using Bluetooth, the locator provides the user device with information about the direction and location of devices located in the view direction of the user.

Furthermore, the locator may provide the user device with reference direction information, that is, a criterion for information about the direction and location of the devices.

The direction providing device functions to notify the user device of the progress direction of the user or the view direction of the user and includes a geomagnetic sensor. A show or clothes may correspond to the direction providing device.

The user device is a device used by a user and refers to the subject which receives information about the location and direction of peripheral devices from the locator and discovers peripheral devices.

The user device may also be expressed as a consumer.

The locator provides the user device with information about the location and direction of peripheral devices to be discovered by the user device.

That is, the locator provides the user device with information about the location and direction of peripheral devices by taking into consideration the location of the user device.

Furthermore, the user device obtains information about a view direction watched by the user or the progress direction of the user through a geomagnetic sensor.

The view direction watched by the user or the progress direction of the user may mean a reference direction for discovering a specific device.

FIG. 12 is a diagram showing an example of a device discovery method proposed in this specification.

As shown in FIG. 12, when a user or user device proceeds in the right direction 1200, the user device may discover only devices (i.e., devices 1, 2, 3) located in the progress direction by taking into consideration the corresponding progress direction.

In this case, the user device may obtain information about the progress direction through an object carried by the user.

The object carried by the user includes a geomagnetic sensor.

In order to perform a device discovery method according to a progress direction, which is proposed in this specification, a mode, procedure, message and parameter are defined as in Table 2.

TABLE 2

| CATEGORY | DESCRIPTION |
| --- | --- |
| Mode | The state in which a device has been set to perform a specific operation |

TABLE 2-continued

| CATEGORY | DESCRIPTION |
| --- | --- |
| Procedure | A series of procedures that need to be performed by a device in order to perform a specific function |
| Message | An operation for delivering a parameter between devices |
| Parameter | A data value delivered to a counterpart through a message or the setting value of a device |

FIG. 13 is a diagram showing an example of a method of performing scanning, which is proposed in this specification.

A mode, procedure, message and parameter necessary to perform scanning may be defined as in FIG. 13.

Referring to FIG. 13, a device 1 and a device 2 determine a scan role regarding which one of the devices 1 and 2 will perform scanning.

As shown in FIG. 13, the device 2 may perform scanning by switching to a scan-acceptable mode in which scan can be performed or setting the scan-acceptable mode.

When a scanning request message is received from the device 1, the device 2 performs scanning.

Thereafter, the device 2 may send the results of the scanning to the device 1.

Table 3 below shows a mode, procedure, message and parameter defined to exchange information about a direction and location between a locator, direction providing device and user device and to discover only devices in the view direction of a user in relation to a device discovery method based on a direction, which is proposed in this specification.

TABLE 3

| NAME | CATEGORY | DESCRIPTION |
| --- | --- | --- |
| Discovery based Direction mode | Mode | A mode in which a discovery procedure according to the direction is permitted |
| Non-Discovery based Direction mode | Mode | A mode in which a discovery procedure according to the direction is not permitted |
| Notify User's direction information Procedure | Procedure | A procedure of providing notification of a direction watched by a user by mounting a geomagnetic sensor on a specific object of the user |
| Share Location information Procedure | Procedure | A procedure of providing notification the location of a user, that is, a criterion, and information about the location of devices based on the location of the user |
| Direction of Magnetic Sensor Request | Message | A message that requests the location of a direction in which the front of an object (e.g., the direction of a shoe cap) including a sensor is located using a geomagnetic sensor |
| Direction of Magnetic Sensor Response | Message | A message through a compass informer receives a request message and delivers a direction value |
| Locator Information Request | Message | A message through a locator requests a value indicative of the location of a device based on information about the location of a user |
| Locator Information Response | Message | A response to a message through which a locator requests a value indicative of the location of a device |
| Reference Direction Request | Message | A message through which a locator requests a direction, that is, a criterion, when the locator notifies a user of the location of devices |
| Reference Direction Response | Message | A response to a message that requests a reference direction |
| Direction Angle | Parameter | An angle (e.g., 0°~360°) necessary to check a direction shown in a geomagnetic sensor |
| Direction | Parameter | A direction (e.g., N, S, W, E, NS, NW, SE or SW) shown in a geomagnetic sensor |

Next, a case is divided into (1) a case where BLE connection between devices has not been established and (2) a case where BLE connection between devices has been established, and a device discovery method based on a progress direction is described below.

The device discovery method based on a progress direction is a method of discovering peripheral devices in which the progress direction of a user or the view direction (or reference direction) of the user has been taken into consideration The reference direction indicates a direction, that is, a criterion, in order to indicate the direction of peripheral devices. The progress direction of a user or the view direction of the user may become the reference direction.

A method of providing the progress direction of a user or the view direction of the user if BLE connection between devices has not been established is first described below.

FIG. 14 is a diagram showing an example of a device discovery method based on a direction if BLE connection between devices has not been established, which is proposed in this specification.

A direction providing device refers to a device which functions to provide a user device with the progress direction of a user or the view direction of the user.

The direction providing device includes a geomagnetic sensor and may be expressed as a compass informer.

Furthermore, the direction providing device may mean an object carried by a user and may be a shoe, clothes or a watch, for example.

A user device may be expressed as a controlled device and is the subject which discovers devices within a specific range. A smartphone may correspond to the user device.

FIG. 14 shows an example in which the user device receives information about the progress direction of a user (or a reference direction or a first direction) from the direction providing device and receives map information, including information about the direction (second direction information) in which peripheral devices are located from a locator.

It is assumed that BLE connection has not been established between the user device and the direction providing device and between the user device and the locator.

Each of the direction providing device and the locator provides the user device with information about the progress direction of the user and direction information related to the location of peripheral devices at specific time intervals (S1410, S1420).

The information about the progress direction of the user is information about the progress direction of the user or user device and about the view direction of the user.

The direction information related to the location of the peripheral devices is information about the direction in which each of the peripheral devices is located based on a reference direction, and may include a direction and angle.

FIG. 15 is a diagram showing another example of a device discovery method based on a direction if BLE connection between devices has not been established, which is proposed in this specification.

FIG. 15 shows a method in which a direction providing device directly sends information about the progress direction of a user (or a reference direction) to a locator and the locator sends information about the direction of peripheral devices to the user device based on the received information about the progress direction of the user.

As in FIG. 14, it is assumed that BLE connection between the user device and the direction providing device and between the user device and the locator has not been established.

Referring to FIG. 15, the direction providing device (or compass informer) directly sends direction information regarding the progress direction of the user or the view direction of the user to the locator (S1510).

The direction providing device includes a geomagnetic sensor.

Thereafter, the locator calculates information about the location of peripheral devices based on the information about the progress direction of the user, which has been received from the direction providing device (S1520).

The information about the location of the peripheral devices indicates the direction and direction angle of the peripheral devices with respect to a reference direction.

Thereafter, the locator sends information about the location of each of the peripheral devices to the user device (S1530).

A method of providing information about the progress direction of a user (or user device) if BLE connection between devices has been established is described below.

FIG. 16 is a diagram showing an example of a device discovery method based on a direction if BLE connection between devices has been established, which is proposed in this specification.

Referring to FIG. 16, it is assumed that BLE connection has been established between a direction providing device, a user device and a locator.

For a BLE connection procedure, reference is made to the aforementioned contents.

First, the user device switches to a discovery mode based on a direction in order to perform discovery using direction information (S1610).

Switching to the discovery mode based on a direction may be construed as being the same as setting the discovery mode based on a direction to be on.

Thereafter, the direction providing device and the user device exchange information about the progress direction of the user or the view direction of the user (S1620).

(Progress) direction information described in this specification may be construed as indicating information about the progress direction of the user or the view direction of the user.

That is, the user device sends a direction request message for requesting progress direction information to the direction providing device (S1621).

The direction request message may be expressed as "Direction of Magnetic Sensor Request."

The direction request message may include a direction value and angle value for the progress direction of the user.

The direction providing device sends a direction response message to the user device in response to the direction request message (S1622).

Each of the direction request message and the direction response message may have a packet form, such as that shown in FIG. 17.

The direction request message and the direction response message may include a direction parameter and an angle parameter.

The direction response message may be expressed as "Direction of Magnetic Sensor Response."

For example, the direction response message may include a direction value and an angle value, such as NE 250°.

The packet form of FIG. 17, as described above, may include a direction parameter 1710 and an angle parameter 1720 which are related to the progress direction of the user.

The packet of FIG. 17 may mean the aforementioned data packet.

The direction parameter (or field) is a direction value determined through a geomagnetic sensor, and may include 8 direction values, such as the north (N), south (S), west (W), east (E), northwest (NW), northeast (NE), southwest (SW) and southeast (SE).

Furthermore, the direction field value may be allocated in bytes.

The angle parameter (or field) is the angle value of a direction determined through a geomagnetic sensor, and may include an angle value of 0°~360°.

The angle parameter may also be expressed as a direction angle parameter.

Likewise, the direction angle field may be allocated in bytes.

Thereafter, the user device and the locator exchange information about the location of peripheral devices (S1630).

The location information may include the direction and angle values of the peripheral devices.

A corresponding procedure is described in more detail with reference to FIG. 18.

FIG. 18 is a diagram showing an example of a method of exchanging information about the locations of peripheral devices, which is proposed in this specification.

Steps S1810 and S1820 are the same as steps S1710 and S1720 of FIG. 17 and thus a detailed description thereof is omitted. The exchange of information about the location of peripheral devices, that is, a difference between FIGS. 18 and 17, is chiefly described below.

The user device may become a criterion for determining the location (or direction) of the peripheral devices.

In this case, the user device requests information about the location and direction of the peripheral devices from the locator.

In this case, the information about the location and direction of the peripheral devices means the direction value and angle value of each of the peripheral devices.

Furthermore, the locator obtains the information about the location or direction of the peripheral devices by taking into consideration the reference direction of the user device, and sends the obtained information to the user device (S1830).

The user device can discover only devices located in the progress direction of the user or the view direction of the user based on the obtained information.

A corresponding procedure is described in more detail. The user device sends a locator information request message for requesting information about the direction and location of the peripheral devices to the locator (S1831).

The location information request message may be a message for requesting the direction in which the peripheral devices are located around the locator.

The locator sends a locator information response message to the user device in response to the location information request message (S1832).

In this case, the peripheral devices have different directions and angles.

Accordingly, the user device may receive a plurality of packet formats from the locator or a single packet format may include the direction and angle values of the plurality of peripheral devices.

Thereafter, the user device sends a reference direction request message for requesting a reference direction, that is, a criterion for the location or direction of the peripheral devices, to the locator (S1833).

The locator sends a reference direction response message to the user device in response to the reference direction request message (S1834).

The user device requests reference direction information, providing notification of whether the location of the peripheral devices is the northwest or southeast to the locator, and receives a response thereto from the locator.

As described above, a direction field included in the packet format indicates a direction value determined through a geomagnetic sensor, and may include 8 direction values, such as the north (N), south (S), west (W), east (E), northwest (NW), northeast (NE), southwest (SW) and southeast (SE).

2 bytes may be allocated as the size of the direction field.

The angle field is a direction angle value determined through a geomagnetic sensor, and may include an angle value of 0° to 360°.

Bytes may be allocated as the size of the direction angle field.

Situations to which the methods of discovering peripheral devices by taking into consideration the progress direction of a user, which have been proposed in this specification, may be applied are described in more detail below with reference to related drawings.

<First Embodiment>

The first embodiment corresponds to a method of discovering only peripheral devices located in front of a user (or user device).

FIG. 19 is a diagram showing an example of a device discovery method based on a direction, which is proposed in this specification.

From FIG. 19, it may be seen that various devices (e.g., TV, a watch, a smartphone, a projector and a printer) which may be connected to a user device through Bluetooth (e.g., BLE) are present around a user or user device.

A method of discovering only peripheral devices within a specific area that a user wants to discover if various peripheral devices are present around the user as in FIG. 19 is described below.

First, a user device receives information about the progress direction of the user or the view direction of the user (i.e., the direction watched by the user) 1910 from a direction providing device including a geomagnetic sensor.

Thereafter, a locator provides the user device with a reference direction (or the progress direction of the user or the view direction of the user), and notifies the user device of information (e.g., northwest or southeast) about the location and direction of the devices around the user device.

In this case, the locator may receive the reference direction information from the direction providing device.

Thereafter, the user device may discover only peripheral devices within the view of the user device by combining the information about the location/direction of the peripheral devices received from the locator and the reference direction information.

<Second Embodiment>

The second embodiment shows another example of a method of discovering only peripheral devices located in front of a user, and shows an example of a method in which when a user enters a museum, a user device discovers only exhibition goods located in front of the user and exchanges data using the discovered exhibition goods and Bluetooth.

FIG. 20 is a diagram showing an example of a situation in which the method proposed in this specification is used in a museum.

Referring to FIG. 20, it is assumed that the user has worn shoes including a (geomagnetic) sensor, has carried a user device (e.g., smartphone), and has entered a museum.

First, the user device receives information about the progress direction of the user from the shoes including the geomagnetic sensor.

In this case, the information about the progress direction indicates the progress direction of the user or the view direction of the user, and may be reference direction information for determining the location and direction of peripheral devices.

Furthermore, the information about the progress direction includes a direction value, such as the east, west, south or north, and an angle value of 0 to 360 degrees.

Thereafter, a locator provides the user device with the location and direction of exhibition goods (i.e., peripheral devices) within the museum, and provides the reference direction information to the user device.

In this case, the exhibition goods can perform Bluetooth communication with the user device and the locator. The locator may be installed on the ceiling of a specific space, such as the ceiling of the museum.

Thereafter, when the exhibition goods are sensed, the user device performs discovery on only devices located in the progress direction of the user by taking into consideration the view direction of the user obtained through the geomagnetic sensor and the information about the direction of the exhibition goods.

Thereafter, the user device exchanges data with the discovered exhibition goods (i.e., peripheral device) through BLE communication with the exhibition goods.

In this case, if the user carries a BLE headset in addition to the user device, he or she may exchange data with the exhibition goods through the BLE headset.

<Third Embodiment>

The third embodiment is an example of a situation in which the method proposed in this specification is used in a BLE mesh network.

That is, the third embodiment corresponds to a method of enabling a user to search for an empty parking space, an exit, etc. more easily in a large underground parking lot by combining the device discovery method based on a direction and a BLE mesh network.

FIG. 21 is a diagram showing an example of a situation the method proposed in this specification is used in a Bluetooth mesh network.

As shown in FIG. 21, it is assumed that lamps (e.g., light-emitting diodes (LEDs)) within the large underground parking lot are a BLE mesh group A, a BLE mesh group B, etc. and form a BLE mesh network.

It is assumed that a user drives down to the large underground parking lot in order to park his or her car.

A user device performs a BLE discovery operation in order to search for an empty parking space.

That is, the user device discovers lamps located in front of the user device (i.e., user view) through a direction providing device (the user's car) and a locator installed on the ceiling of the large underground parking lot, and performs BLE connection with the discovered lamps.

If BLE connection has been established between the user device and the lamp (e.g., G1) located in the view direction of the user device, the lamp G1 exchanges information with the remaining lamps of the BLE mesh group A to which the lamp G1 belongs and provides the user device with information for guiding the user to the empty parking space.

In this case, lamps not located within the user view or lamps within BLE mesh groups which are not located within the user view are automatically turned off.

Accordingly, the third embodiment can have an advantage in that lamps in a user view direction are turned on and lamps at positions through which a user has passed are automatically turned off.

Furthermore, the drawings have been divided and described for convenience of description, but the embodiments described with reference to the drawings may be merged to implement a new embodiment. Furthermore, to design a computer-readable recording medium on which a program for executing the aforementioned embodiments has been recorded also belongs to the range of right of the present invention according to a need of those skilled in the art.

The device discovery method based on a direction according to this specification is not limited and applied to the aforementioned configurations and methods according to the embodiments, and some or all of the aforementioned embodiments may be selectively combined and configured so that the present invention is modified in various manners.

The device discovery method based on a direction proposed in this specification may be implemented in a processor-readable recording medium included in a network device, in the form of code readable by a processor. The processor-readable recording medium includes all types of recording devices in which data readable by a processor is stored. The recording medium may include ROM, RAM, CD-ROM, magnetic tapes, floppy disks, and optical data storages, for example. Furthermore, the processor-readable recording medium may be implemented in the form of carrier waves, such as transmission through the Internet. Furthermore, the processor-readable recording medium may be distributed to computer systems connected over a network, and the processor-readable code may be stored and executed in a distributed manner.

Furthermore, although the some embodiments of this specification have been illustrated and described above, this specification is not limited to the aforementioned specific embodiments, and a person having ordinary skill in the art to which this specification pertains may modify the present invention in various ways without departing from the gist of the claims. Such modified embodiments should not be individually interpreted from the technical spirit or prospect of this specification.

Furthermore, in this specification, both the apparatus and the method have been described, and the descriptions of both the apparatus and method may be complementarily applied, if necessary.

INDUSTRIAL APPLICABILITY

This specification is used for a device discovery method based on a direction using Bluetooth.

The invention claimed is:

1. A method for performing discovery in a wireless communication system, the method performed by a first device and comprising:
    turning on a direction-based discovery mode;
    obtaining first direction information including a view direction of a user from a second device, wherein the second device includes a geomagnetic sensor for measuring the view direction of the user;
    exchanging second direction information related to locations of one or more peripheral devices with a third device; and
    performing discovery for a peripheral device existing in the view direction of the user among the peripheral devices based on the first direction information and the second direction information,
    wherein the exchanging the second direction information comprises:
        requesting reference direction information which is a criterion for determining a direction in which the peripheral devices are located to the third device;
        receiving the reference direction information from the third device;
        transmitting a location information request message for requesting the second direction information to the third device; and
        receiving a location information response message from the third device in response to the location information request message.

2. The method of claim 1, wherein the obtaining of the first direction information comprises:
    transmitting a direction request message for requesting the first direction information to the second device; and
    receiving a direction response message from the second device in response to the direction request message.

3. The method of claim 1, wherein the first direction information and the second direction information comprise at least one of a direction parameter or a direction angle parameter.

4. The method of claim 1, wherein the obtaining the first direction information comprises:
    receiving the first direction information from the second device at specific time intervals.

5. The method of claim 3, wherein the direction parameter is one of north, south, east, west, northeast, northwest, southeast or southwest.

6. The method of claim 3, wherein the direction angle parameter has a value of 0 to 360 degrees.

7. The method of claim 1, wherein:
    the peripheral devices comprise light-emitting diode (LED) lamps, and
    the LED lamps form a Bluetooth low energy (BLE) mesh group.

8. The method of claim 7, further comprising performing BLE connection with an LED lamp in the view direction of the user,
    wherein the BLE-connected LED lamp exchanges information for indicating a specific direction with other lamps within an identical BLE mesh group.

9. A first device for performing discovery in a wireless communication system, the first device comprising:
    a transceiver; and
    a processor functionally connected to the transceiver,
    wherein the processor is configured to:
        turn on a direction-based discovery mode,
        obtain first direction information including a view direction of a user from a second device, wherein the second device includes a geomagnetic sensor for measuring the view direction of the user, exchange second direction information related to locations of one or more peripheral devices with a third device, and perform control so that discovery is performed on a peripheral device existing in the view direction of the user among the peripheral devices based on the first direction information and the second direction information, wherein the exchanging the second direction information comprises:

requesting reference direction information which is a criterion for determining a direction in which the peripheral devices are located to the third device;

controlling the transceiver to receive the reference direction information from the third device;

controlling the transceiver to transmit a location information request message for requesting the second direction information to the third device; and controlling the transceiver to receive a location information response message from the third device in response to the location information request message.

* * * * *